United States Patent
Moriyama et al.

(10) Patent No.: US 7,609,435 B2
(45) Date of Patent: Oct. 27, 2009

(54) DISPLAY MEDIUM, DISPLAY DEVICE, AND DISPLAYING METHOD

(75) Inventors: Hiroaki Moriyama, Kanagawa (JP); Yasuo Yamamoto, Kanagawa (JP); Jun Kawahara, Kanagawa (JP); Masaaki Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 136 days.

(21) Appl. No.: 11/448,578

(22) Filed: Jun. 7, 2006

(65) Prior Publication Data
US 2007/0126694 A1 Jun. 7, 2007

(30) Foreign Application Priority Data
Dec. 6, 2005 (JP) ............................. 2005-351994

(51) Int. Cl.
*G02B 26/00* (2006.01)
*G09G 3/34* (2006.01)
(52) U.S. Cl. ...................................... 359/296; 345/107
(58) Field of Classification Search ............... 359/296; 345/107; 430/32; 204/600
See application file for complete search history.

(56) References Cited

U.S. PATENT DOCUMENTS

| 6,017,584 | A | 1/2000 | Albert et al. |
| 6,831,771 | B2 * | 12/2004 | Ho et al. ................. 359/296 |
| 2002/0180688 | A1 * | 12/2002 | Drzaic et al. ............. 345/107 |
| 2004/0218252 | A1 * | 11/2004 | Motoi et al. ............. 359/296 |

FOREIGN PATENT DOCUMENTS

| JP | 64-86116 | 3/1989 |
| JP | 4-199085 | 7/1992 |
| JP | 2000-35598 | 2/2000 |
| JP | 2000-322004 | 11/2000 |
| JP | 2002-162649 | 6/2002 |
| JP | 2002-333643 | 11/2002 |
| JP | 2004-20818 | 1/2004 |
| JP | 2004-522180 | 7/2004 |

* cited by examiner

*Primary Examiner*—William C Choi
(74) *Attorney, Agent, or Firm*—Fildes & Outland, P.C.

(57) ABSTRACT

A display medium including a light-modulating layer containing charged mobile particles assuming a color at a lightness corresponding to the dispersion state of the charged mobile particles and first particles with lower mobility than the charged mobile particles. The first particles assume a color at a lightness that is outside a lightness range that the charged mobile particles can exhibit.

17 Claims, 3 Drawing Sheets

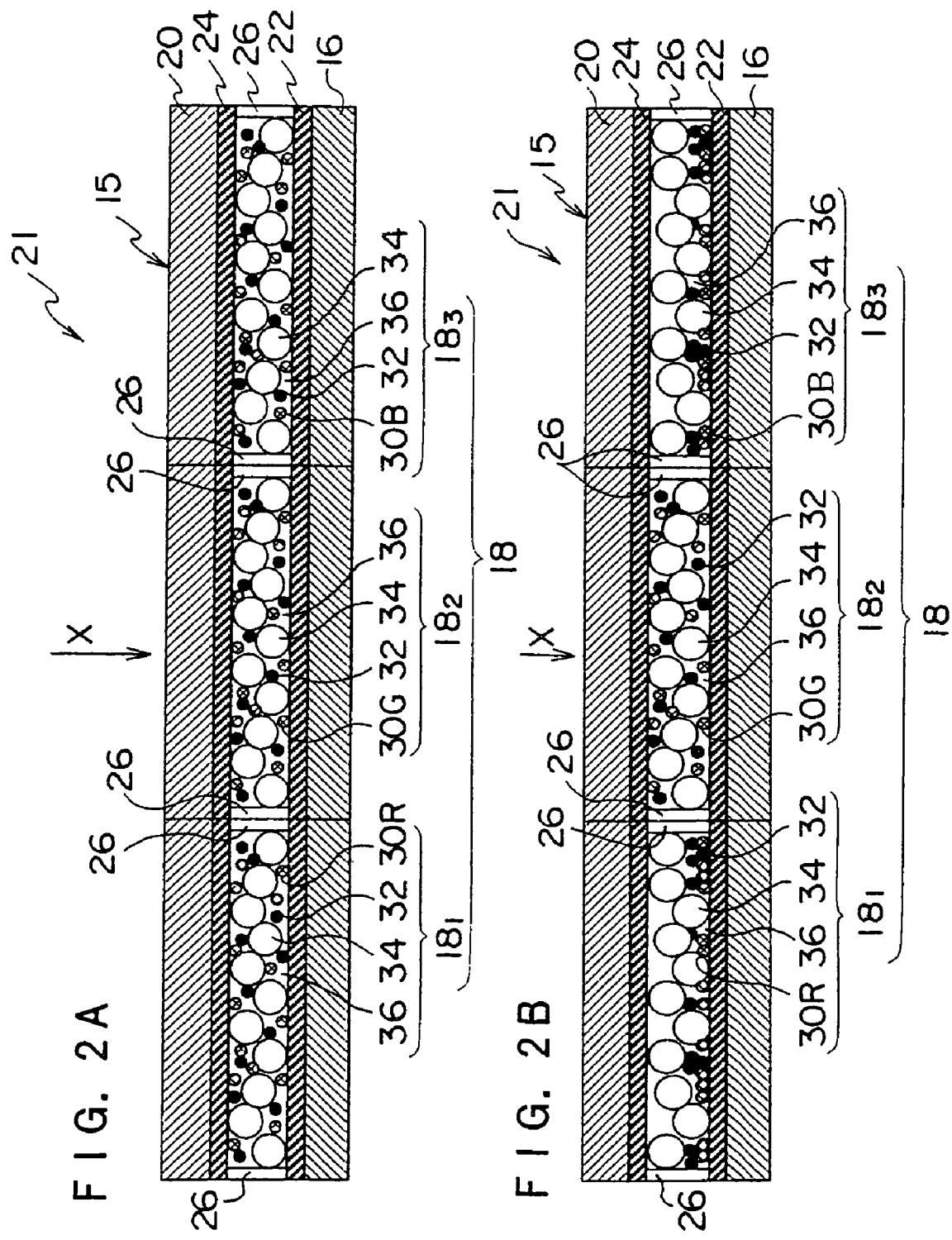

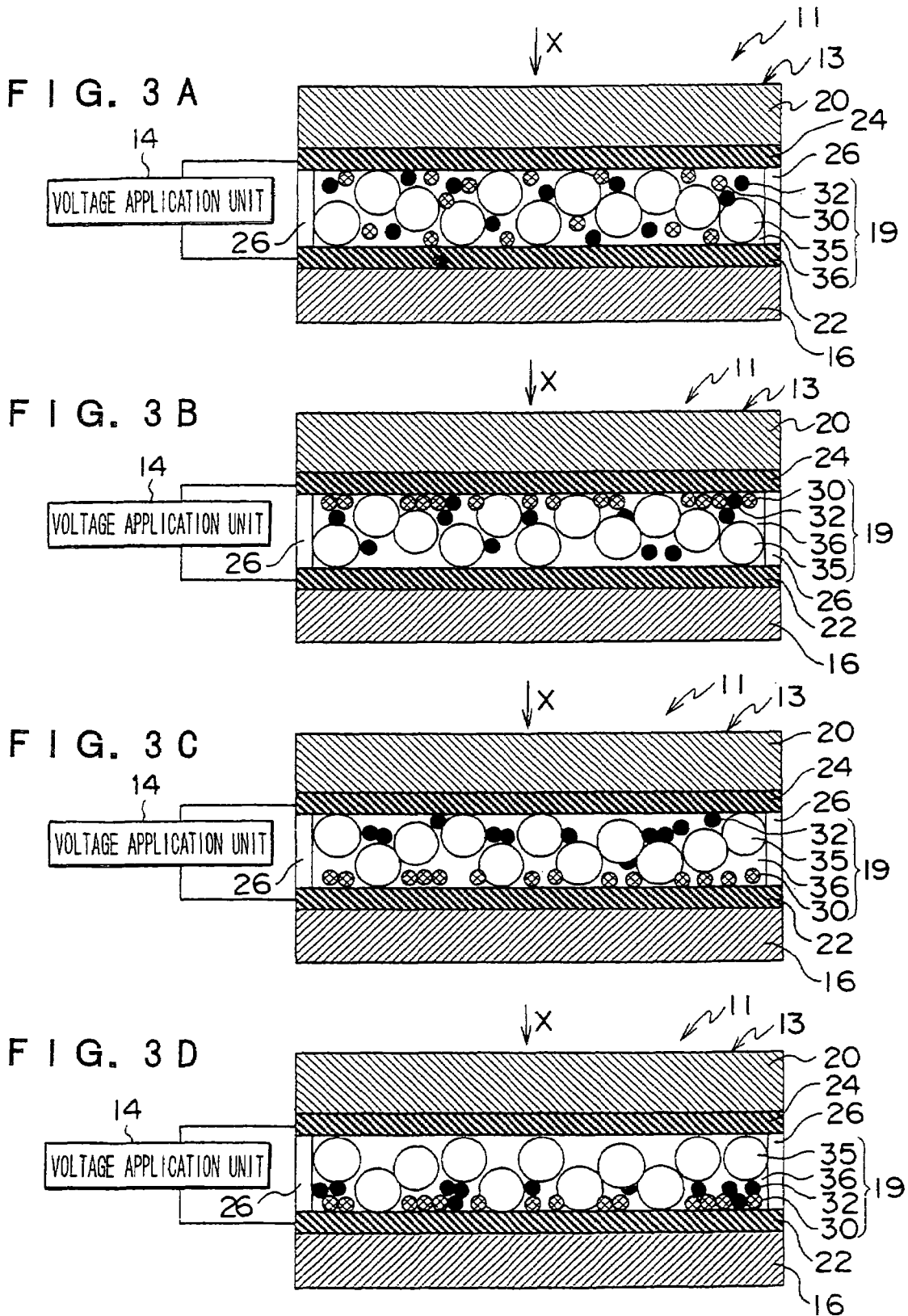

DISPLAY MEDIUM, DISPLAY DEVICE, AND DISPLAYING METHOD

CROSS-REFERENCE TO RELATED APPLICATION

This application claims priority under 35 USC 119 from Japanese patent Application Nos. 2005-351994, the disclosure of which is incorporated by reference herein.

BACKGROUND

1. Technical Field

The present invention relates to a display medium, a display device, and a displaying method, and in particular, to a display medium, a display device, and a displaying method using charged mobile particles forming a color in the dispersed state.

2. Related Art

Along with progress of the advanced information society, there exists increasing needs for electronic paper systems, color display systems, and large-area display systems. To satisfy the needs, various display technologies such as CRT, liquid crystal, EL, LED, and plasma displays have been developed. In addition to these self-luminous systems, reflective display systems lower in power consumption and friendly to the eyes are now under development. A typical example of reflective display systems is a reflective liquid crystal device.

On the other hand, there are significant needs for next-generation electronic paper display systems, but promising methods therefor have yet to be established. Examples of the methods include electrophoretic, liquid-crystal, and organic EL methods.

Since the liquid crystal method involves a filter, it has been difficult to reduce the thickness and weight of the medium, while the organic EL method does not have memory function because it is a self-luminous method, and thus has a problem in the range of applications.

SUMMARY

According to an aspect of the invention, there is provided a display medium comprising a light-modulating layer containing charged mobile particles and first particles, wherein the charged mobile particles assume a color at a lightness that corresponds to the dispersion state of the charged mobile particles, and the first particles have lower mobility than the charged mobile particles and assume a color at a lightness that is outside the range of the lightness of the color that the charged mobile particles can assume.

BRIEF DESCRIPTION OF THE DRAWINGS

Embodiments of the present invention will be described in detail based on the following figures, wherein:

FIG. 1A is a schematic view illustrating a state in which the charged mobile particles, the first particles, and the second particles are all dispersed in the light-modulating layer;

FIG. 1B is a schematic view illustrating a state in which the charged mobile particles, the first particles, and the second particles have been moved toward the display substrate side;

FIG. 1C is a schematic view illustrating a state in which the charged mobile particles, the first particles, and the second particles are moving toward the rear-face substrate side; and FIG. 1D is a schematic view illustrating a state in which the charged mobile particles, the first particles, and the second particles have moved toward rear-face substrate side;

FIGS. 2A and 2B are schematic views illustrating an example of the configuration of the display medium and the display device according to an aspect of the invention in which light-modulating unit cells are aligned in the direction along the plate face of the rear-face substrate;

FIG. 2A is a schematic view illustrating a state before an electric field is generated in the light-modulating unit cells; and FIG. 2B is a schematic view illustrating an example of a state after the electric field is generated in the light-modulating unit cells;

FIGS. 3A to 3D are schematic views illustrating an example of the display medium and display device according to an aspect of the invention which is different the example shown in FIG. 1;

FIG. 3A is a schematic view illustrating a state in which the charged mobile particles, the first particles, and the second particles are all dispersed in the light-modulating layer;

FIG. 3B is a schematic view illustrating a state in which the charged mobile particles, the first particles, and the second particles have moved toward the display substrate side;

FIG. 3C is a schematic view illustrating a state in which the charged mobile particles, the first particles, and the second particles are moving toward the rear-face substrate side; and FIG. 3D is a schematic view illustrating a state in which the charged mobile particles, the first particles, and the second particles have moved toward the rear-face substrate side.

DETAILED DESCRIPTION

Figure 1A:
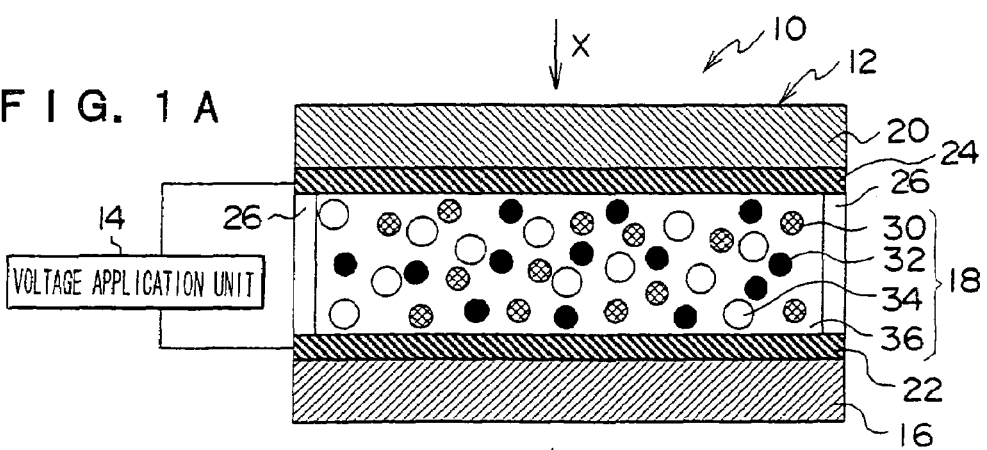
FIGS. 1A to 1D are schematic views illustrating a display medium and a display device according to an aspect of the invention.

Hereinafter, the present invention will be described in detail.

<Display Medium and Display Device>

The display medium according to an aspect of the invention has a light-modulating layer containing charged mobile particles assuming a color at a lightness that corresponds to the dispersion state of the charged mobile particles and first particles (first other particles) that are lower in mobility than the charged mobile particles and assume a color at a lightness outside the range of the lightness of the color that the charged mobile particles can assume.

The first particles may assume a color that is lower in lightness than the lightness range of the color that the charged mobile particles can have.

A combination of the light-modulating layer and an electric field-generating unit for generating an electric field in the light-modulating layer can be used as a display device.

When the light-modulating layer contains the charged mobile particles assuming a color at a lightness corresponding to the dispersion state of the charged mobile particles, and the first particles that are lower in mobility than the charged mobile particles and assume a color at a lightness outside (e.g., lower than) the lightness range of the color that the charged mobile particles can assume, the charged mobile particles move faster in the light-modulating layer than the first particles lower in mobility than the charged mobile particles upon generation of an electric field at the same strength in the light-modulating layer.

Accordingly, it is possible to adjust the ratio of the charged mobile particles to the first particles lower in lightness than the charged mobile particles in a portion of the light-modulating layer which portion is nearer to the viewer side, by adjusting the strength of the electric field generated in the light-modulating layer and the period of electric field generation, thereby allowing the charged mobile particles and the first particles lower in lightness than the charged mobile particles to move in the light-modulating layer at different traveling speeds.

It is thus possible to control the lightness of the color of the display medium or display device containing the light-modulating layer when the light-modulating layer is viewed from the viewer side, in the lightness range according to the degree of migration of the charged mobile particles and the first particles in the light-modulating layer.

As a result, it is possible to form a color in a lightness range that is wider than the lightness range that the charged mobile particles can exhibit according to the dispersion state thereof.

The light-modulating layer may contain additionally second particles (second other particles) that are lower in mobility than the first particles and assume a color at a lightness higher than the lightness range of the color that the charged mobile particles can have.

When the light-modulating layer contains the charged mobile particles, the first particles showing a color at a lightness lower than the lightness range of the color that the charged mobile particles can assume, and additionally the second particles showing a color at a lightness higher than the lightness range, and an electric field at the same strength is generated in the light-modulating layer, the charged mobile particles move faster than the first particles in the light-modulating layer, and the first particles move in the light-modulating layer faster than the second particles.

Thus, it is possible to adjust the ratio between the charged mobile particles, the first particles lower in lightness than the charged mobile particles, and the second particles having a lightness higher than the charged mobile particles in a portion of the light-modulating layer which portion is closer to the viewer side, by adjusting the strength of the electric field generated in the light-modulating layer and the period of the electric field generation, thereby allowing the charged mobile particles, the first particles lower in lightness than the charged mobile particles, and the second particles having a lightness higher than the charged mobile particles to move in the light-modulating layer at different traveling speeds It is thus possible to adjust the lightness of the color of the display medium or display device containing the light-modulating layer when the light-modulating layer is viewed from the viewer side, in the lightness range according to the degree of the migration of the charged mobile particles, the first particles, and the second particles in the light-modulating layer.

Accordingly, the light-modulating layer can assume a color in a lightness range wider than the lightness range that the charged mobile particles can exhibit according to the dispersion state thereof.

(Light-Modulating Layer)

The light-modulating layer contained in the display medium or display device according to an aspect of the invention at least contains charged mobile particles assuming a color at a lightness that corresponds to the dispersion state of the charged mobile particles, and first particles that are lower in mobility than the charged mobile particles and assume a color at a lightness lower than the lightness range of the color that the charged mobile particles can assume. The light-modulating layer may further contain second particles that are lower in mobility than the first particles and assume a color at a lightness higher than the lightness range of the color that the charged mobile particles can assume. The light-modulating layer may further contain, as needed, an insulating liquid, a polymer resin, a high-molecular weight pigment dispersant, and the like.

The light-modulating layer is a region containing materials such as those described above. When the light-modulating layer is used for a display device, the light-modulating layer has a function of displaying various colors.

The mobility described above is a distance the charged mobile particles, the first particles, or the second particles can move within a unit time per unit electric field strength. That is, the mobility means the average traveling speed of the charged mobile particles, the first particles, or the second particles per unit electric field.

The mobility of the charged mobile particles contained in the light-modulating layer of the display medium or display device according to an aspect of the invention is higher than that of the first particles. In addition, the mobility of the first particles is higher than that of the second particles.

The difference in mobility between the charged mobile particles and the first particles may be $1 \times 10^{-6}$ $cm^2/Vs$ or more, or may be $5 \times 10^{-6}$ $cm^2/Vs$ or more, or may be $1 \times 10^{-5}$ $cm^2/Vs$ or more. The difference in mobility between the first particles and the second particles may be $1 \times 10^{-6}$ $cm^2/Vs$ or more, or may be $5 \times 10^{-6}$ $cm^2/Vs$ or more, or may be $1 \times 10^{-5}$ $cm^2/Vs$ or more.

In the above ranges, the relationship between the migration distances per unit time of the charged mobile particles, the first particles, and the second particles are adequate when an electric field is generated in the light-modulating layer, whereby favorable change in lightness can be generated in the light-modulating layer.

The mobility of the charged mobile particles, the first particles, or the second particles contained in the light-modulating layer can be determined by adding the charged mobile particles, the first particles, or the second particles into a dispersion liquid for the light-modulating layer, which will be described below in detail, sandwiched between electrodes, and applying a voltage between these electrodes; and measuring the strength of the electric field generated in the light-modulating layer, the period of the electric field application to these electrodes, and the distance the charged mobile particles, the first particles, or the second particles migrate within the period with such an electric field generated in the light-modulating layer.

The migration distance can be determined, for example, by observing and measuring the migration of particles and the color change associated with the migration with a CCD.

Alternatively, the mobility can also be determined by applying an electric field to the light-modulating layer and evaluating the process of the change in lightness of the light-modulating layer as a change of transmittance or reflectance over time.

Specifically, the mobility can be determined by adding the charged mobile particles, the first particles, or the second particles into a dispersion liquid for the light-modulating layer, which will be described below in detail, sandwiched between electrodes, and applying a voltage between these electrodes; and measuring the electric field strength generated in the light-modulating layer, the period of the application of the electric field between these electrodes, and the change in the transmittance or reflectance of the light-modulating layer after the generation of such an electric field is initiated in the light-modulating layer, with a spectrophotometer, for example USB2000 manufactured by KEYENCE Corporation.

Hereinafter, the charged mobile particles, the first particles, and the second particles contained in the light-modulating layer in the display medium or display device according to an aspect of the invention will be described in detail.

(1) Charged Mobile Particles:

The charged mobile particles contained in the light-modulating layer assume a color having a lightness that corresponds to the dispersion state of the charged mobile particles.

Specifically, the lightness of the color that the charged mobile particles assume varies, depending on the state whether the particles are dispersed or not dispersed (e.g., in aggregated state) in the dispersion medium in the light-modulating layer, and the charged mobile particles assume color that is higher in lightness in the dispersed state, and assume a color that is darker (lower in lightness) in a more aggregated state.

The "color different in lightness" means a color different in density, i.e., in lightness, and may be accompanied by change in hue. Thus, it is possible to control development of a desired color tone and a lightness by adjusting the dispersion state of the charged mobile particles.

The charged mobile particles should assume a color having a lightness that corresponds to the dispersion state of the charged mobile particles and migrate when contained in the light-modulating layer and placed under an applied electric field (voltage). Other properties of the charged mobile particles are not particularly limited. The charged mobile particles may be colloidal metal particles having a color forming function due to surface plasmon resonance, from the viewpoints of color-forming efficiency, transparency, and stability.

Hereinafter, the charged mobile particles will be described by using colloidal metal particles as an example, but are not limited thereto.

It is possible to adjust the hue by properly selecting the kind of metal, shape, particle diameter (volume average particle diameter), and others of the charged mobile particles, especially of the colloidal metal particles.

Color formation by colloidal metal particles (e.g., colloidal gold particles) is caused by a coloring mechanism called surface plasmon absorption due to the plasma vibration of an electron. Color development by the surface plasmon absorption is said to be caused by the nonlinear electric polarization due to vibration of free electrons in a metal in photoelectric field and the resultant occurrence of electric charges on the particle surface. The color formation of the colloidal metal particles is high in chroma and light transparency, and is also superior in durability and the like.

Such color formation of colloidal metal particles can be observed with particles having a particle diameter of approximately several to several-dozen nm, so-called nanoparticles, and the particles may be colloidal particles having a narrower particle diameter distribution, considering applications as a colorant.

Examples of the metal component constituting the metal colloid particles include noble metals (gold, silver, ruthenium, rhodium, palladium, osmium, iridium, platinum, etc.) and copper. Gold, silver or platinum, or an alloy containing at least one of these noble metals is preferable among these metals, and an alloy containing at least one of gold or silver is more preferable.

The method for obtaining the metal colloid particles known in the art include a chemical method including preparing nano-particles through metal atoms or metal clusters by reducing metal ions, or a physical methods in which a bulk metal is evaporated in inert gas to form fine metal particles, which are trapped with a cold trap; or in which a thin metal film is formed on a thin polymer film, and then is broken by heating, and the metal fine particles are dispersed in the polymer in the solid state. While general examples of the chemical method, which is advantageous for preparing the metal colloid particles with no need of special apparatuses, will be explained later, the method is not restricted thereto.

The raw material for the metal colloid particles may be a metal compound containing the metal components as described above. The metal compounds are not particularly restricted so long as they contain the metal components as described above, and examples thereof include chlorauric acid, silver nitrate, silver acetate, silver perchlorate, chloroplatinic acid, potassium chloroplatinate, copper (II) chloride, copper (II) acetate, and copper (II) sulfate.

While the metal colloid particles may be obtained as a dispersion liquid of the metal colloid particles protected with a dispersant by reducing the metal compound dissolved in a solvent into a metal, the particles may be obtained as a solid sol by removing the solvent of the dispersion liquid. However, other forms of the metal colloid particles may also be used.

A polymer pigment dispersant described below may be used when the metal compound is dissolved. Stable metal colloid particles protected with the dispersant may be obtained by using the polymer pigment dispersant.

When metal colloid particles are used in an aspect of the invention, the metal colloid particles may be used in the form of a dispersion liquid, or in the form of a re-dispersed solution of a solid sol obtained by removing the solvent. The form of the metal colloid is not particularly restricted.

When the metal colloid particles are used in the form of a dispersion liquid, the solvent for preparing the solution may be selected from insulating liquids described later. When the solid sol is used by re-dispersion, the solvent used for preparing the solid sol is not particularly restricted, and may be selected from various solvents including the insulating liquids described later. In an exemplary embodiment, the liquid for re-dispersion is selected from the insulating liquids described later.

The volume average particle diameter of the charged mobile particles is preferably in the range of 1 to 100 nm, more preferably in the range of 2 to 50 nm. The charged mobile particles in the range of 1 to 100 nm are suitable for practical applicability and have improved color density. Precipitation can be prevented and color density can be improved when the volume average particle diameter is in the range of 2 to 50 nm. Consequently, dependency on viewing angle may be reduced while contrast may be improved.

The metal colloid particles are able to assume various colors depending on the kind of the metal component(s), the shape, and the volume average particle diameter. Accordingly, various hues including RGB colors can be obtained by using the charged mobile particles in which the kind of metal, the shape and the volume average particle diameter are controlled, so that the display device of an aspect of the invention can be used as a color display device. A RGB full-color display device or medium can be obtained when the shape and the particle size of the metal colloid particles are appropriately controlled.

When the respective colors—R, G, and B—in the RGB system are desired, the volume average particle diameter of the metal colloid particles cannot be restricted uniquely since it depends on the metal used, the preparation conditions of the particles, and the shape of the particles. When the metal colloid particles are gold colloid particles for example, R color, G color, and B color can be sequentially obtained when the volume average particle diameter is increased.

The method for measuring the volume average particle diameter used in an aspect of the invention may be a laser diffraction-scattering method in which a group of particles are irradiated with laser light, and the average particle diameter is determined from the intensity distribution pattern of the diffracted or scattered light.

The metal colloid particles may be prepared by the conventional preparation method described in a literature, "*Kinzoku Nano-Ryuushino Gousei Chousei, Control Gijutsu-to Ouyoutenkai*" (Synthesis, Preparation and Control Technology of Metal Nano-Particles, and Scope of Their Application) (published by Technical Information Institute, Co., LTD. 2004). While an example of the method is described below, the method is not restricted thereto.

—Solid Sol—

An example of the metal solid sol for preparing the metal colloid particles will be explained below.

In the solid sol of metal colloid particles of an aspect of the invention, the content of metal colloid particles may be 50 mmol or more per 1 kg of polymer pigment dispersant—which will be described later—from the viewpoint of color forming property. The color forming property is likely to be insufficient when the content of metal colloid particles is less than 50 mmol. In an exemplary embodiment, the content is 100 mmol or more.

In the solid sol of metal colloid particles, the volume average particle diameter of the metal colloid particles may be from 1 to 100 nm, or from 2 to 50 nm. The metal solid sol of an aspect of the invention may exhibit a narrow particle diameter distribution. A wide particle diameter distribution may lead to reduced color saturation.

The solid sol as described above has high color saturation and good color forming property due to high concentration of metal colloid particles. Since the solid sol has good compatibility with polymer resins (binders), it is stable and retains sufficient color forming property without coagulation even when added to a polymer resin (binder). Other additives may be added, if necessary. The solid sol may be used in the form of a hydrosol or an organosol by being dissolved in an appropriate solvent.

—Production Method of Solid Sol—

While an example of production methods of the solid sol is described below, the method is not restricted thereto. In this exemplary method, a metal compound is dissolved in a solvent, a polymer pigment dispersant is added, the metal compound is reduced to a metal to form metal colloid particles protected with the polymer pigment dispersant, and the solid gel is obtained by subsequent removal of the solvent.

In the method, the metal compound is dissolved in a solvent. The solvent is not particularly restricted so long as it is able to dissolve the metal compound, and examples of the solvent include water and water-soluble organic solvents such as acetone, methanol and ethylene glycol. Only a single solvent may be used, or a combination of two or more solvents may be used. In an exemplary embodiment, water and one or more water-soluble organic solvents are used in combination.

When the solvent is a mixed solvent containing water and a water-soluble organic solvent, the following procedure may be adopted: the metal compound is dissolved in water, and then the water-soluble organic solvent is added to form a solution. In this procedure, the metal compound may be dissolved in water at a concentration of 50 mM (50 mmol/l) in water. When the concentration is less than 50 mM, the resultant solid sol may have only a low proportion of metal colloid particles. In an exemplary embodiment, the concentration is 100 mM or more.

When silver is used as the metal component, the aqueous solution may have a pH of 7 or less. When silver nitrate, for example, is used as the silver compound and the pH exceeds 7, by-products such as silver oxide are formed during reduction of silver ions, and the aqueous solution becomes turbid. When the pH of the aqueous solution exceeds 7, the pH may be adjusted to 7 or less by adding about 0.1 N of nitric acid.

In an exemplary embodiment, the water-soluble organic solvent is added to water containing the metal compound dissolved therein such that the volume ratio of the solvent to water is 1.0 or higher. The polymer pigment dispersant may not dissolve when the ratio is lower than 1.0. The ratio is, for example, 5.0 or higher.

In the preparation of the metal colloid particles according to an aspect of the invention, addition of a polymer pigment dispersant to the solution of the metal compound is also effective. The polymer pigment dispersant may be insoluble in water when the solvent is mixed solvent containing water and water-soluble organic solvent. When the dispersant is soluble in water, it is difficult to precipitate the colloid particles at removal of the water-soluble organic solvent for obtaining a solid sol. Examples of the water insoluble polymer pigment dispersant include DISPERBYK-161, DISPERBYK-166 (manufactured by BYK Chemie Co.), and SOLSPERSE 24000 and SOLSPERSE 28000 (manufactured by Zeneca Co.).

The amount of addition of the polymer pigment dispersant is preferably 20 to 1,000 parts by weight relative to 100 parts by weight of metal. The dispersibility of the metal colloid particles tends to be insufficient when the amount is less than 20 parts by weight. When the amount exceeds 1,000 parts by weight, the proportion of the polymer pigment dispersant in the binder resin is high when mixed in a paint or a molded resin, which may lead to defective physical properties and the like. The amount of addition of the polymer dispersant may be from 50 to 650 parts by weight.

In the preparation of the metal colloid particles according to an aspect of the invention, a polymer pigment dispersant is added to the solution of the metal compound, and then the metal ions are reduced. The reduction method is not particularly restricted, and may be, for example, a chemical reduction method involving addition of a compound, or a reduction method involving irradiation with light using a high-pressure mercury lamp.

The compound is not particularly restricted, and alkali metal borohydrides such as sodium borohydride, hydrazine compounds, citric acid and salts thereof, and succinic acid and salts thereof, which have been conventionally used as reducing agents, may be used. Amines are also usable as the reducing agent.

The metal ion is reduced to a metal at around room temperature by adding an amine into the solution of the metal compound under stirring. Using the amine eliminates the use of a dangerous or toxic reducing agent, and the metal compound can be reduced at a reaction temperature of 5 to 100° C., or 20 to 80° C., without heating or without using any special light illuminating apparatus.

The amine is not particularly restricted, and examples of the amine include: aliphatic amines such as propylamine, butylamine, hexylamine, diethylamine, dipropylamine, dimethylethylamine, diethylmethylamine, triethylamine, ethylenediamine, N,N,N',N'-tetramethyl ethylenediamine, 1,3-diaminopropane, N,N,N',N'-tetramethyl-1,3-diaminopropane, triethylene tetramine and tetraethylene pentamine; alicyclic amines such as piperidine, N-methyl piperidine, piperazine, N,N'-dimethyl piperazine, pyrrolidine, N-methylpyrrolidine and morpholine; aromatic amines such as aniline, N-methyl aniline, N,N-dimethyl aniline, toluidine, anisidine and phenetidine; and aralkyl amines such as benzylamine, N-methyl benzylamine, N,N-dimethyl benzylamine, phenethylamine, xylylenediamine and N,N,N',N'-tetramethyl xylylenediamine. Other examples include alkanolamines such as methylamino ethanol, dimethylaminoethanol, triethanolamine, ethanolamine, diethanolamine, methyl diethanolamine, propanolamine, 2-(3-aminopropylamino)ethanol, butanolamine, hexanolamine and dimethylaminopropanol. In an exemplary embodiment, the amine is an alkanolamine.

The amount of amine to be added may be from 1 to 50 mol per 1 mol of the metal compound. Reduction is insufficient when the amount is less than 1 mole, while the coagulation resistance of the resultant metal colloid particles is lowered when the amount exceeds 50 moles. In an exemplary embodiment, the amount of amine is from 2 to 8 moles.

No heating and special illumination apparatus are needed when sodium borohydride is used as the reducing agent since the reducing reaction proceeds at room temperature.

The amount of addition of sodium borohydride may be from 1 to 50 moles per 1 mole of the metal compound. Reduction is insufficient when the amount is less than 1 mole, while the coagulation resistance of the resultant metal colloid particles is lowered when the amount exceeds 50 moles. In an exemplary embodiment, the amount of sodium borohydride is from 1.5 to 10 moles.

When citric acid or a salt of citric acid is used as the reducing agent, the metal ions are reduced by reflux under heating in the presence of an alcohol. Sodium citrate may be used as citric acid or a salt thereof.

The amount of citric acid or a salt of citric acid to be added may be from 1 to 50 moles per 1 mole of the metal compound. Reduction is insufficient when the amount is less than 1 mole, while the coagulation resistance of the resultant metal colloid particles is lowered when the amount exceeds 50 moles. In an exemplary embodiment, the amount of citric acid or a salt thereof is from 1.5 to 10 moles.

In the preparation of the metal colloid particles according to an aspect of the invention, the metal colloid particles protected with the polymer pigment dispersant are allowed to precipitate after reduction of the metal ions, and then the solvent is removed. When water and a water-soluble organic solvent are used as the solvent, the solvent may be removed by the following methods in accordance with the property of the polymer pigment dispersant.

When the polymer pigment dispersant is insoluble in water, the following procedure may be adopted: the water-soluble solvent is removed by evaporation so as to precipitate the metal colloid particles protected with the polymer pigment dispersant, and then water is removed. Since the polymer pigment dispersant is insoluble in water, the metal colloid particles protected with the polymer pigment dispersant are precipitated by the removal of the water-soluble organic solvent.

The evaporation rate of the water-soluble organic solvent may be larger than that of water. When the evaporation rate of the organic solvent is lower than water and a water-insoluble polymer pigment dispersant is used, the water-soluble organic solvent cannot be removed prior to removal of water in the process of solid sol formation by removal of the solvent, and thus the metal colloid particles cannot be precipitated.

When the polymer pigment dispersant is soluble in an organic solvent, the metal colloid particles protected with the polymer pigment dispersant can be precipitated by adding an excess amount of a non-polar organic solvent that does not dissolve the polymer pigment dispersant, followed by removing the solvent by decantation.

The metal colloid particles protected with the polymer pigment dispersant may be washed with ion-exchange water after removing the solvent. When the metal colloid particles protected with the polymer pigment dispersant is precipitated by adding the excess amount of non-polar organic solvent, the colloid particles may be washed with the non-polar solvent.

In the method of producing the solid sol as described above, the solid sol obtained has a high color density and high color saturation since the solid sol has an average colloid particle diameter of 1 to 100 nm with a narrow particle diameter distribution.

The method of producing the solid sol of the invention is simple and includes only a few processes—formation of a solution by dissolving a metal compound in a solvent, reduction of the compound into metal subsequent to addition of the polymer pigment dispersant, and removal of the solvent. The solid sol obtained can have high color saturation, and the sol contains the metal colloid particles in a high content, compared to conventional metal solid sols. In an exemplary embodiment, the solid sol can be easily manufactured under a mild condition of 20 to 80° C. by using alkanolamines.

While the metal colloid particles can be prepared by the methods as described above, commercially available metal colloid particles may be used in aspects of the invention so long as they are able to assume colors in a dispersion state, and the lightness corresponds to the dispersion state.

While the metal colloid particles can be prepared by specific methods (i) to (iv) below, the methods are not restricted thereto.

—Method of Preparing Dispersion Liquid of Metal Colloid Particles—

The dispersion liquid of the metal colloid particles of an aspect of the invention may be prepared in either an aqueous system or a non-polar solvent system. For example, while a dispersion liquid of the metal colloid particles using gold or silver may be prepared by the following preparation methods, the method is not restricted thereto.

(i) A metal compound (for example, hydrogen tetrachloroaurate (III) tetrahydrate) is dissolved in an insulating liquid (for example, water), the solution is mixed, under stirring, with a second aqueous solution containing 1.5 times by weight of polymer dispersant (for example, SOLSPERSE 20000) for pigments relative to the weight of metal (for example, gold). An aliphatic amine (for example, dimethylaminoethanol) is added to this mixed solution to start a reducing reaction of aurate ions, followed by filtration and concentration to obtain a solution of gold colloid particles.

(ii) After dissolving a metal compound (for example, hydrogen tetrachloroaurate (III) tetrahydrate) in water, the solution is mixed, under stirring, with a second solution containing 1.5 times by weight of polymer dispersant (for example, SOLSPERSE 24000) for pigments dissolved in an organic solvent (for example, acetone) relative to the weight of metal (for example, gold). An aliphatic amine (for example, dimethylaminoethanol) is added to this mixed solution to start a reducing reaction of aurate ions, followed by evaporation of the organic solvent to obtain a solid sol containing gold colloid particles and the polymer pigment dispersant. The solid sol is washed with water by decantation, and a solution of the gold colloid particles is obtained by adding an organic solvent (for example, ethanol) to the solid sol.

(iii) After dissolving a metal compound (for example, silver (I) nitrate) in water, the solution is mixed, under stirring, with a second aqueous solution containing 1.5 times by weight of polymer dispersant (for example, SOLSPERSE 20000) for pigments relative to the weight of metal (for example, silver). After starting a reducing reaction of silver ions by adding an aliphatic amine (for example, dimethylaminoethanol) to this mixed solution, an aqueous solution of silver colloid particles is obtained by filtration and concentration.

(iv) After dissolving a metal compound (for example, silver (I) nitrate) in water, the solution is mixed, under stirring, with a solution containing 1.5 times by weight of polymer dispersant (for example SOLSPERSE 24000) for pigments dissolved in an organic solvent (for example, acetone). After starting a reducing reaction of silver ions by adding an aliphatic amine (for example, dimethylaminoethanol) to this mixed solution, the organic solvent is evaporated to obtain a solid sol containing silver colloid particles and the polymer pigment dispersant. The solid sol is washed with water by decantation thereafter, and a solvent-based silver colloid particles is obtained by adding an organic solvent (for example, toluene).

The metal colloid particles and solutions thereof described in JP-A No. 11-76800 may be used in some embodiments of the invention.

As described above, the charged mobile particles contained in the light-modulating layer according to an aspect of the invention show a mobility higher than those of the first and second particles.

In regard to the method of making the mobility of the charged mobile particles fall in a predetermined mobility range (higher than those of the first and second particles), it is possible to produce charged mobile particles having a particular mobility, by adjusting the kinds and concentrations of surfactant, pigment dispersant, surface treatment agent for charged mobile particles, and the like, and by adjusting the processing period for the addition and stirring of these components.

Examples of the surfactant include cationic surfactants (alkylamine salts, quaternary ammonium salts, etc.), non-ionic surfactants (polyoxyethylene alkylethers, polyoxyalkylene alkylethers, polyoxyethylene derivatives, sorbitan fatty acid esters, polyoxyethylene sorbitan fatty acid esters, polyoxyethylene sorbitol fatty acid esters, glycerol fatty acid esters, polyoxyethylene fatty acid esters, polyoxyethylene-hardened castor oil, polyoxyethylene alkylamines, alkyl alkanol amides, etc.), anionic surfactants (alkylsulfuric acid ester salts, polyoxyethylene alkylether sulfuric acid ester salts, alkylbenzenesulfonic acid salts, alkylnaphthalenesulfonic acid salts, alkylsulfosuccinic acid salts, alkyldiphenyletherdisulfonic acid salts, fatty acid salts, polycarboxylic acid-derived polymer surfactants, aromatic sulfonic acid formalin condensate sodium salts, β-naphthalenesulfonic acid formalin condensate sodium salts, etc.), amphoteric surfactants, and the like.

Because the influence from the concentration of the surfactant and the pigment dispersant and the processing time on the mobility of the colloidal metal particles vary depending on the kinds of the surfactant and the pigment dispersant used, a rule cannot be cannot be defined uniquely. However, in general, higher concentrations of the surfactant and the pigment dispersant relative to the metal in the colloidal metal particles used as charged mobile particles lead to increase in mobility, while lower concentrations of the surfactant and the pigment dispersant relative to the metal leads to decrease in mobility.

In addition, a longer processing time with the surfactant and the pigment dispersant leads to increase in mobility, while a shorter processing time leads to decrease in mobility.

Thus, it is possible to adjust the mobility of the charged mobile particles to a particular value, by appropriately selecting the production method for the charged mobile particles.

Further, the mobility can be adjusted to a particular value also by appropriately selecting the metal species, the particle diameter, and the shape of the colloidal metal particles.

The content (weight %) of the charged mobile particles relative to the total weight of the light-modulating layer is not particularly limited as long as it is a content giving a desired hue, and the content may be adjusted according to the thickness of the light-modulating layer (thickness of the light-modulating layer in the viewing direction) when the light-modulating layer is used in a display medium or a display device.

For obtaining a desired hue, the content may be increased when the light-modulating layer is thicker, and the content may be reduced when it is thinner. In general, the content is from 0.01 to 80 wt % with respect to the total weight of the light-modulating layer.

The volume fraction of the charged mobile particles in the light-modulating layer may be from 0.01 to 50 vol %, or from 0.1 to 40 vol %. When the volume fraction is 0.01 to 50 vol %, a display device having a favorable color forming property can be obtained utilizing the color of the charged mobile particles effectively.

First Particle:

The light-modulating layer contains at least charged mobile particles as described above and first particles having different properties from the charged mobile particles.

The first particles have different properties from the charged mobile particles. Specifically, the first particles assume a color at a lower lightness than the lightness range of the color that the charged mobile particles contained in the light-modulating layer can form depending on the dispersion state of the charged mobile particles. The mobility of the first particles is lower than that of the charged mobile particles.

Thus, the ratio of the charged mobile particles to the first particles present in the portion of the light-modulating layer that is nearer to the viewer's side can be adjusted by moving the charged mobile particles and the first particles in the light-modulating layer, whereby the display medium or the display device can assume a color in a lightness wider range than that achieved by the charged mobile particles alone.

The color of the first particles may be black in consideration of expansion of the lightness range and improvement in contrast of the display device or display medium.

When the first particles are black in color, the light-modulating layer contains black particles (as first particles) having a lightness that is particularly low in the lower lightness range than the range that the charged mobile particles can exhibit, and thus can exhibit a color within a wider lightness range than that achieved in the case where first particles contained in the layer have a relatively high lightness within the lower lightness range than the range that the charged mobile particles can exhibit.

The light-modulating layer contains at least the charged mobile particles and the first particles which assume a color that have a lower lightness than the lightness range of the color that the charged mobile particles can assume and which has a lower mobility than the charged mobile particles. The first particles, which are contained in the light-modulating layer together with the charged mobile particles, have more influence on the change in lightness owing to their low lightness. Therefore, the light-modulating layer is able to assume a color within a wider lightness range than the lightness range of the color that the charged mobile particles can assume.

The volume average particle diameter of the first particles may be from 1 to 1,000 nm, or 2 to 500 nm, in view of the color-forming efficiency and the mobility. When it is less than 1 nm, the first particles has a lower color forming efficiency and cannot assume a color with sufficiently high lightness. When it is more than 1,000 nm, the first particles move less easily in the space among the second particles, resulting in lower mobility.

The volume fraction of the first particles in the light-modulating layer may be determined according to the thickness of the light-modulating layer, the volume fraction of the charged mobile particles, and the volume fraction of the second particles.

When the first particles and the charged mobile particles are contained but the second particles are not contained in the same light-modulating layer, the volume fraction (Z) of the first particles in the light-modulating layer and the volume fraction (Y) of the charged mobile particles in the light-modulating layer may be substantially the same in view of the hue of the resulting display device. When Z is larger than Y, the light-modulating layer has an excessively low lightness and the resulting display device as a whole shows darker display. On the other hand, when Z is smaller than Y, the light-modulating layer may not be able to show low lightness, resulting in insufficient change in lightness.

Specifically, the volume fraction of the first particles in the light-modulating layer may be from 0.01 to 50 vol %, or from 0.1 to 45 vol %. When the volume fraction is 0.01 to 50 vol %, it is possible to effectively exhibit colors, for example black, of the first particles having a lower lightness than the lightness range that the charged mobile particles can exhibit, thus being able to expand the lightness width of the color that the layer can assume.

The material of the first particles is not particularly limited as long as the first particles assume a color at a lower lightness than the lightness range of the color that the charged mobile particles contained in the same light-modulating layer can assume. Any particles, both organic and inorganic, assuming a color at a lower lightness than the lightness range of the color that the charged mobile particles contained in the light-modulating layer can assume, may be used without restriction, according to the lightness range.

Examples thereof include carbon black, iron black, manganese ferrite black, cobalt ferrite black, copper chromium black, copper chromium manganese black, black titanium lower oxide, aluminum powder, copper powder, lead powder, tin powder, and zinc powder. The particles can be obtained by from these materials by known methods, such as pulverization and granulation. The particles may comprise one or more material selected from the above contained in a polymer material such as polyester, polymethacrylate, polyacrylate, or polymethyl methacrylate.

The first particles may be prepared by a wet production method such as suspension polymerization, emulsion polymerization, or dispersion polymerization, or alternatively, by a conventional pulverization classification method. Particles prepared by a wet production method are spherical in shape, while particles obtained by the pulverization classification method are undefined in shape.

The spherical particles or the undefined-shape particles prepared by these production methods may be heat-treated additionally for uniformization of the shape.

Examples of the methods of uniformizing particle diameter distribution include adjustment of the granulation condition in the wet production method described above and classification of the particles once obtained.

In regard to the adjustment of the granulation condition in the wet production method, it is possible to control the particle diameter distribution of particles, for example, by adjusting the agitation speed at the time of dispersing an organic phase containing materials for the display particles in an aqueous phase, or by adjusting the concentration of a surfactant when the surfactant is used.

As described above, the first particles contained in the light-modulating layer of the display device or display medium according to an aspect of the invention have a mobility that is lower than that of the charged mobile particles but higher than that of the second particles.

In regard to the method of preparing the first particles having a predetermined mobility (i.e., lower than that of the charged mobile particles but higher than that of second particles as described above), similar methods to those used for the control of the mobility of the charged mobile particles can be adopted; e.g., by appropriately adjusting the kinds and concentrations of surfactant, pigment dispersant, and the like, and the period of processing such as addition and agitation of such agents.

Second Particle:

The light-modulating layer contains at least the charged mobile particles and the first particles having different properties from the charged mobile particles, and may additionally contain the second particles.

The second particles have different properties from the charged mobile particles. Specifically, the second particles assume a color at a higher lightness than the lightness range that the charged mobile particles can exhibit depending on the dispersion state of the charged mobile particles contained in the light-modulating layer. In addition, the second particles have a lower mobility than that of the first particles or the charged mobile particles.

Thus, the charged mobile particles, the first particles, and the second particles are moved in the light-modulating layer by adjusting the ratio between the charged mobile particles, the first particles and the second particles present in the portion of the light-modulating layer that is closer to the viewer, whereby the display medium or the display device can assume a color at a lightness in a wider lightness range than the range of the color that the charged mobile particles can assume.

As for the lightness of the color that the second particles assume, the second particles may be white in color in view of expansion of the lightness range of the color that the display device or the display medium can assume and of improvement in contrast.

When the second particles are white in color, the light-modulating layer contains white particles (as the second particles) having a particularly high lightness within a higher lightness than the lightness range of the color that the charged mobile particles can assume, and thus, can assume a color within a wider lightness range than that achieved in the case where the second particles contained in the light-modulating layer has a relatively low lightness within the higher lightness range than the lightness range of the color that the charged mobile particles can assume.

The volume average particle diameter of the second particles is larger than those of the charged mobile particles and the first particles in view of expansion of the lightness range of the light-modulating layer to the extent that the charged mobile particles and the first particles can migrate in the space among the second particles.

The second particles assuming a color at a lower lightness than the lightness range that the charged mobile particles can exhibit has less influence on the lightness change of the light-modulating layer than the first particles assuming a color at a higher lightness than the lightness range; therefore, the light-modulating layer can also assume a color within a lower lightness range by making the volume average particle diameter of the second particles greater than that of the first particles.

When the volume average diameter of the second particles is greater than those of the charged mobile particles and the first particles, the charged mobile particles and the first particles migrate in the space among the second particles more easily; and thus, it is possible to improve the color display response by the charged mobile particles and the lightness change response by the first particles.

The volume average particle diameter of the second particles and the amount thereof in the light-modulating layer are such values that the first particles and the charged mobile particles can migrate in the space among the second particles. The volume average particle diameter of the second particles is larger than those of the first particles and the charged mobile particles, and is determined in consideration of the volume average particle diameters and the volume fractions of the first particles and the charged mobile particles contained in the same light-modulating layer and in consideration of the thickness of the light-modulating layer.

As described above, the volume average particle diameter (X) of the second particles may be greater than the volume average particle diameter (Y) of the charged mobile particles, and the ratio (X/Y) may be in the range of 2 to 50,000, or in the range of 20 to 10,000.

In addition, as described above, the volume average particle diameter (X) of the second particles is preferably greater than the volume average particle diameter (Z) of the first particles, and the ratio (X/Z) may be in the range of 2 to 50,000, or in the range of 20 to 10,000.

Specifically, the volume average particle diameter of the second particles may be from 0.1 to 50 µm, or from 1 to 20 µm. When the particle diameter is from 0.1 to 50 µm, the second particles can be used as a spacer that maintains the thickness of the light-modulating layer, and the thickness of the light-modulating layer can be made more uniform.

Regarding the ratio between the volume fraction (X) of the second particles in the light-modulating layer, the volume fraction (Y) of the charged mobile particles in the light-modulating layer and the volume fraction (Z) of the first particles, X/(Y+Z) may be in the range of 1 to 9,500 in view of color-forming efficiency, mobility, and expansion of the lightness range.

Specifically, the volume fraction of the second particles in the light-modulating layer may be from 30 to 95 vol %, or from 50 to 90 vol %. When the volume fraction is from 30 to 95 vol %, the color (e.g., white) of the second particles is displayed effectively, thus widening the lightness width of the color.

Any organic or inorganic materials may be used for preparation of the second particles without restriction. Examples of the organic materials include melamine resins, acrylic resins, and polyester resins. Examples of the inorganic materials include titanium oxide, silica, and magnesium oxide.

The second particles may be prepared by a wet production method such as suspension polymerization, emulsion polymerization; or dispersion polymerization, or alternatively, by a conventional pulverization classification method. Particles prepared by a wet production method are spherical in shape, while particles obtained by the pulverization classification method are undefined in shape.

The spherical particles or the undefined-shape particle prepared by these production methods may be heat-treated additionally, so as to uniformize the shape of the particles.

Examples of the methods of uniformizing the particle diameter distribution include adjustment of the granulation condition in the wet production method described above and classification of the particles once obtained.

In regard to the adjustment of the granulation condition in the wet production method, it is possible to control the particle diameter distribution of the particles, for example, by adjusting the agitation speed at the time of dispersing an organic phase containing materials for the display particles in an aqueous phase, or by adjusting the concentration of a surfactant when the surfactant is used.

As described above, the second particles contained in the light-modulating layer of the display device or display medium according to an aspect of the invention have a lower mobility than the charged mobile particles and the first particles.

In regard to the method of preparing the second particles having a predetermined mobility (i.e., lower than the charged mobile particles and the first particles as described above), it is possible to prepare the first particles having the predetermined mobility by methods similar to those usable for the adjustment of the mobility of the charged mobile particles, i.e., by appropriately adjusting the kinds and concentrations of surfactant, pigment dispersant, and the like, and the period of processing such as addition of such agents and agitation.

Dispersion Medium:

An insulating liquid may be used as the dispersion medium for dispersing the charged mobile particles, the first particles, and the second particles in the light-modulating layer.

Examples of the insulating liquid include hexane, cyclohexane, toluene, xylene, decane, hexadecane, kerosene, paraffin, isoparaffin, silicone oil, dichloroethylene, trichloroethylene, perchloroethylene, high purity petroleum, ethylene glycol, alcohols, ethers, esters, dimethylformamide, dimethylacetamide, dimethylsulfoxide, N-methylpyrrolidone, 2-pyrrolidone, N-methyl formamide, acetonitrile, tetrahydrofuran, propylene carbonate, ethylene carbonate, benzin, diisopropyl naphthalene, olive oil, isopropanol, trichlorotrifluoroethane, tetrachloroethane and dibromotetrafluoroethane, and mixtures thereof.

Water (so-called pure water) may be used as the dispersion medium after removal of impurities for achieving the following volume resistivity. The volume resistivity may be $10^3$ $\Omega \cdot cm$ or more, or from $10^7$ to $10^{19}$ $\Omega \cdot cm$ or more, or from $10^{10}$ to $10^{19}$ $\Omega \cdot cm$. When the volume resistivity is such a value, air bubbles generated by electrolysis of the liquid caused by electrode reaction can be more efficiently suppressed, and excellent repeating stability can be obtained without impairing electrophoretic characteristics of the particles every time electricity is applied.

Acid, alkali, salts, dispersion stabilizing agents, stabilizing agents for anti-oxidation or UV absorption, antibiotics, antiseptics, and the like may be added, if necessary. Such agents may be added in such an amount that the volume resistivity falls within the range specified above.

Polymer Resin

The charged mobile particles (metal colloid particles) may be dispersed in a polymer resin. The polymer resin may be a polymer gel or a network polymer.

Examples of the polymer resin include naturally occurring polymer gels such as agarose, agaropectin, amylose, sodium alginate, propyleneglycol alginate ester, isolichenan, insulin, ethyl cellulose, ethyl hydroxyethyl cellulose, curdlan, casein, carrageenan, carboxymethyl cellulose, carboxymethyl starch, callose, agar, chitin, chitosane, silk fibroin, guar gum, quince seed, crown gall polysaccharide, glycogen, glucomannan, keratan sulfate, keratin protein, collagen, cellulose acetate, gellan gum, schizophyllan, gelatin, vegetable ivory mannan, tunicin, dextran, dermatan sulfate, starch, tragacanth gum, nigeran, hyaluronic acid, hydroxyethyl cellulose, hydroxypropyl cellulose, pustulan, funoran, decomposed xyloglucan, pectin, porphyran, methyl cellulose, methyl starch, laminaran, lichenan, lenthinan, and locust bean gum, as well as almost all synthetic polymer gels.

Other examples include polymers containing functional groups such as alcohol, ketone, ether, ester and amide in repeating units, for example polyvinyl alcohol, poly(meth) acrylamide and its derivatives, polyvinyl pyrrolidone, and polyethylene oxide, and copolymers containing these polymers. In an exemplary embodiment, gelatin, polyvinyl alcohol, or poly(meth)acrylamide is used from the viewpoint of stability in manufacturing and electrophoretic characteristics. These polymer resins can be used together with an insulating liquid.

Polymer Pigment Dispersant

While the polymer pigment dispersant is not particularly restricted, those described below can be used.

Examples of the polymer pigment dispersant include:

(i) a polymer having pigment affinity groups on the main chain and/or on plural side chains and also having a comb-like structure containing plural side chains constituting solvation moieties; (ii) a copolymer having plural pigment affinity moieties containing pigment affinity groups in the main chain; and (iii) a linear polymer having pigment affinity groups containing pigment affinity groups at the terminal of its main chain.

The pigment affinity group as used herein refers to a functional group that is strongly adsorbed on the surface of the pigment. Examples thereof include tertiary amino groups, quaternary ammonium, heterocyclic groups having basic nitrogen atoms, a hydroxyl group, and a carboxyl group, in an organosol; and a phenyl group, a lauryl group, a stearyl group, a dodecyl group, and an oleyl group, in a hydrosol. The pigment affinity group exhibits strong affinity to metal. The polymer pigment dispersant is able to exhibit sufficient performance as a protective colloid of metal owing to the presence of such pigment affinity groups therein.

The polymer (i) of the comb-like structure contains plural side chains constituting solvation moieties, as well as plural side chains having plural pigment affinity groups. These side chains are bonded to the main chain as if they are comb teeth. The term "comb-like structure" used herein refers to this structure. Pigment affinity groups may be present not only at the terminal of the side chain, but also at the midway of the side chain and/or in the main chain. The solvation moieties have affinity for the solvent, and have a hydrophilic or hydrophobic structure. The solvation moieties are composed of, for example, water-soluble polymer chains or hydrophobic polymer chains.

The comb-like polymer (i) is not particularly restricted. Examples thereof include: a polymer comprising poly(ethyleneimine) or salts thereof having a structure containing at least one poly(carbonyl-C3 to C6-alkyleneoxy) chain as disclosed in JP-A No. 5-177123, in which each chain has 3 to 80 carbonyl-C3 to C6-alkyleneoxy groups and is linked to poly (ethyleneimine) by an amide group or a salt cross-linking group; a polymer containing a reaction product between poly (lower alkylene)imine and polyester having free carboxylic acid groups as disclosed in JP-A No. 54-37082, in which at least two polyester chains are linked to each poly(lower alkylene)imine chain; and a pigment dispersant obtained by allowing an amine compound and a carboxylic group-containing prepolymer with a number average molecular weight of 300 to 7,000 to react, simultaneously or in an arbitrary order, with a high molecular weight epoxy compound having epoxy groups at the terminal as disclosed in Japanese Patent Publication (JP-B) No. 7-24746.

The polymer (i) of the comb-like structure may contain from 2 to 3,000 pigment affinity groups in a molecule. Dispersion stability is insufficient when the number of the groups is less than 2. When the number of the groups exceeds 3,000, handling of the polymer is difficult due to an excessively high viscosity, and color saturation is decreased due to a wide particle diameter distribution of the colloid particles. In an exemplary embodiment, the number of pigment affinity groups in a molecule is from 25 to 1,500.

The polymer (i) of the comb-like structure may have 2 to 1,000 side chains that constitute solvation moieties. Dispersion stability is insufficient when the number of the side chains is less than 2. When the number of the side chains exceeds 1,000, handling of the polymer is difficult due to an excessively high viscosity, and the color saturation is decreased due to a wide particle diameter distribution of the colloid particles. In an exemplary embodiment, the number of the side chains constituting solvation moieties in a molecule is from 5 to 500.

The polymer (i) of the comb-like structure may have a number average molecular weight of 2,000 to 1,000,000. Dispersion stability is insufficient when the molecular weight is less than 2,000. When the molecular weight exceeds 1,000, 000, handling of the polymer is difficult due to an excessively high viscosity, and the color saturation is decreased due to a wide particle diameter distribution of the colloid particles. In an exemplary embodiment, the number average molecular weight of the polymer (i) is from 4,000 to 500,000.

In the copolymer (ii), which has plural pigment affinity moieties containing pigment affinity groups in the main chain, the plural pigment affinity groups are aligned along the main chain, and the pigment affinity groups are, for example, hanging from the main chain. The pigment affinity moiety as used in the invention refers to a moiety having one or more pigment affinity groups and functioning as an anchor for adsorption on the surface of the pigment.

Examples of the copolymer (ii) include: a reaction product of a mixture of polyisocyanate and a monohydroxy compound, monohydroxy carboxylic acid or monoaminomonocarboxylic acid with a compound having at least one basic cyclic nitrogen and an isocyanate-reactive group disclosed in JP-A No. 4-210220; a polymer in which groups having plural tertiary amino groups or basic cyclic nitrogen atoms are hanging from the main chain composed of polyurethane/polyurea disclosed in JP-A Nos. 60-16631, 2-612 and 63-241018; a copolymer containing sterically stabilizing units having water-soluble poly(oxyalkylene) chains, structural units, and amino group-containing units disclosed in JP-A No. 1-279919, in which the amino group-containing units contain a tertiary amino group or acid addition salts thereof, or a quaternary ammonium group, and the copolymer contains 0.025 to 0.5 meq of amino groups per 1 g of the copolymer; and an amphipathic copolymer disclosed in JP-A No. 6-100642 containing a main chain containing an addition polymer and a stabilizer unit containing at least one C1 to C4 alkoxypolyethylene or polyethylene-copropyleneglycol (meth)acrylate, the amphipathic copolymer having a weight average molecular weight of 2,500 to 20,000, the main chain containing up to 30% by weight of non-functional structural units and up to 70% by weight of the stabilizer unit and functional unit in total, the functional unit being a substituted or non-substituted styrene-containing unit, hydroxyl group-containing unit, or carboxyl group-containing unit, and the ratios between the hydroxyl group and carboxyl group, between the hydroxyl group and styrene group, and between the hydroxyl group and propyleneoxy group or ethyleneoxy group being in the range of 1:0.10 to 26.1, in the range of 1:0.28 to 25.0, and in the range of 1:0.80 to 66.1, respectively.

The copolymer (ii) may have 2 to 3,000 pigment affinity groups in one molecule. Dispersion stability is insufficient when the number of the groups is less than 2. When the number of the groups exceeds 3,000, handling of the copolymer is difficult due to an excessively high viscosity and the color saturation is decreased since the particle diameter distribution of the colloid particles is broad. In an exemplary embodiment, the number of the pigment affinity groups is from 25 to 1,500.

The copolymer (ii) may have a number average molecular weight of 2,000 to 1,000,000. Dispersion stability is insufficient when the molecular weight is less than 2,000. When the molecular weight exceeds 1,000,000, handling of the copolymer is difficult due to an excessively high viscosity and the color saturation is decreased since the particle diameter distribution of the colloid particles is broad. In an exemplary embodiment, the number average molecular weight is from 4,000 to 500,000.

While the linear polymer (iii), which has pigment affinity moieties containing pigment affinity groups at one terminal of the main chain, has one or more pigment affinity moieties containing the pigment affinity groups only at one end of the main chain, the polymer has sufficient affinity to the surface of the pigment.

The linear polymer (iii) is not particularly restricted. Examples thereof include an A-B block polymer in which one of the blocks is basic as disclosed in JP-A No. 46-7294; an A-B block polymer in which an aromatic carboxylic acid is introduced into A-block as disclosed in U.S. Pat. No. 4,656,226; an A-B block polymer in which one end is a basic functional group as disclosed in U.S. Pat. No. 4,032,698; an A-B block polymer in which one end is an acidic functional group as disclosed in U.S. Pat. No. 4,070,388; and an A-B block polymer disclosed in JP-A No. 1-204914 improved in weather resistant and anti-yellowing in which an aromatic carboxylic acid is introduced into A-block disclosed in U.S. Pat. No. 4,656,226.

The linear polymer (iii) may have 2 to 3,000 pigment affinity groups in one molecule. Dispersion stability is insufficient when the number of the groups is less than 2. When the number of the groups exceeds 3,000, handling of the copolymer is difficult due to an excessively high viscosity and the color saturation is decreased since the particle diameter distribution of the colloid particles is broad. In an exemplary embodiment, the number of the pigment affinity groups is from 5 to 1,500.

The linear polymer (iii) may have a number average molecular weight of 1,000 to 1,000,000. Dispersion stability is insufficient when the molecular weight is less than 1,000. When the molecular weight exceeds 1,000,000, handling of the copolymer is difficult due to an excessively high viscosity and the color saturation is decreased since the particle diameter distribution of the colloid particles is broad. In an exemplary embodiment, the number average molecular weight is from 2,000 to 500,000.

Commercially available polymer dispersants for pigments may be used. Examples of the commercially available polymer dispersant include SOLSPERSE 20000, SOLSPERSE 24000, SOLSPERSE 26000, SOLSPERSE 27000 and SOLSPERSE 28000 (manufactured by Zeneca Co.); DISPERBYK-160, DISPERBYK-161, DISPERBYK-162, DISPERBYK-163, DISPERBYK-166, DISPERBYK-170, DISPERBYK-180, DISOER BYK 182, DISPERBYK-184 and DISPERBYK-190 (manufactured by BYK Chemie Co.); EFKA-46, EFKA-47, EFKA-48 and EFKA-49 (manufactured by EFKA Chemical Co.); Polymer 100, Polymer 120, Polymer 150, Polymer 400, Polymer 401, Polymer 402, Polymer 403, Polymer 450, Polymer 451, Polymer 452 and Polymer 453 (manufactured by EFKA Chemical Co.); AJISPER PB-711, AJISPER PA-111, AJISPER PB-811 and AJISPER PW-911 (manufactured by Ajinomoto Co.); FLOREN DOPA-158, FLOREN DOPA-22, FLOREN DOPA-17, FLOREN TG-730W, FLOREN G-700 and FLOREN TG-720W (manufactured by Kyoeisha Chemical Co.).

When the polymer pigment dispersant is a polymer with a graft structure having pigment affinity groups on a side chain and having side chains constituting solvation moieties (polymer (i) with the comb-like structure), or a polymer having pigment affinity groups on the main chain (the copolymer (ii) and liner polymer (iii)), the dispersibility of colloid particles is good and the polymer is suitable as a protective colloid for metal colloid particles. A dispersion of metal colloid particles containing a high concentration of metal colloid particles can be obtained by using the polymer pigment dispersant.

In the invention, the high-molecular weight pigment dispersant may have a softening temperature of 30° C. or higher. A softening temperature of lower than 30° C. may lead to blocking of the solid metal sol obtained. The softening temperature can be 40° C. or higher.

The content of the high-molecular weight pigment dispersant may be from 20 to 1000 parts by weight, with respect to the 100 parts by weight of the colloidal metal particles used as the charged mobile particles. A content of less than 20 parts by weight may lead to insufficient dispersion of the colloidal metal particles, while a content of more than 1,000 parts by weight may lead to increase in the amount of the high-molecular weight pigment dispersant in the binder resin when the particles are blended in a paint or a resin molding, thus causing problems such as deterioration in physical properties. The content can be from 50 to 650 parts by weight.

(Display Device)

Hereinafter, the configuration of the display device according to an aspect of the invention will be described with reference to FIG. 1. In description of the drawings, elements having the same function throughout the Figures are indicated with the same reference character, and duplicated description thereof is omitted.

FIGS. 1A to 1D show an example of the display device 10 according to an aspect of the invention.

As shown in FIG. 1A, the display device 10 according to an aspect of the invention contains a display medium 12 having a light-modulating layer 18, and a voltage application unit 14 for generating an electric field in the light-modulating layer 18.

The display medium 12 includes a rear-face substrate 16, a display substrate 20 facing the rear-face substrate 16 at a certain distance, multiple spacers 26, a light-modulating layer 18, a first electrode 22, and a second electrode 24.

The first electrode 22, the light-modulating layer 18, the second electrode 24, and the display substrate 20 are disposed on the rear-face substrate 16 in that order.

Multiple spacers 26 are placed between the rear-face substrate 16 and the display substrate 20 to keep a predetermined clearance therebetween.

The light-modulating layer 18 is a region enclosed by the first electrode 22 laminated on the rear-face substrate 16, the spacers 26, and the second electrode 24 laminated on the display substrate 20 (hereinafter, referred to as compartment or light-modulating unit cell), and is a layer having a function to display various colors.

That is, the light-modulating layer 18 is divided into multiple light-modulating unit cells that are formed by dividing the region between the rear-face substrate 16 and the display substrate 20 into multiple compartments with the spacers 26.

The light-modulating layer 18 includes a dispersion liquid at least containing charged mobile particles 30, first particles 32, and second particles 34, each of which assumes a color corresponding to the dispersion state of the particles, as well as a dispersion medium 36.

The voltage application unit 14, which generates an electric field in the light-modulating layer 18 by applying a voltage between the first electrode 22 and the second electrode 24, is connected to the first electrode 22 and second electrode 24 such that signals can be sent therebetween. The first electrode 22, the second electrode 24, and the voltage application unit 14 jointly represent the electric field-generating unit of the display medium according to an aspect of the invention.

The display substrate 20 and the rear-face substrate 16 are made of a transparent substrate. The rear-face substrate may not be a transparent substrate when the display device is used as a reflective device.

Examples of the transparent substrate include film or plate substrates of a polymer such as polyester (e.g., polyethylene terephthalate), polyimide, polymethyl methacrylate, polystyrene, polypropylene, polyethylene, polyamide, nylon, polyvinyl chloride, polyvinylidene chloride, polycarbonate, polyether sulfone, silicone resin, polyacetal resin, fluororesin, a cellulose derivative, or polyolefin; and inorganic substrates such as glass substrates, metal substrates, and ceramic substrate. In an exemplary embodiment, the transparent substrate has a light transmittance (for visible light) of at least 50%.

The material for the spacer 26 is not particularly limited, and any one of known resin materials may be used. A photosensitive resin may be used from the viewpoint of productivity.

The width of the spacer 26 (length in the direction perpendicular to the lamination direction of the display medium 12) is not particularly limited. In general, a smaller width is effective from the viewpoint of the definition of the display device 10. In an exemplary embodiment, the width is approximately from 1 μm to 1 mm.

The height of the spacer 26, i.e., thickness of the light-modulating layer 18, is decided properly according to the size, weight, color, and the like of the display medium 12 to be prepared, and is generally, approximately from 2 to 1,000 μm.

The members and the layers above are connected to each other with adhesive layers (not shown). The material for the adhesive layer is not particularly limited, and a thermosetting resin, an ultraviolet-curing resin, or the like may be used. The material for the adhesive layer may be a material that does not affect the material of the spacer 26 or the material of each of the members constituting the display medium 12 such as the dispersion medium 36 contained in the light-modulating layer 18.

A transparent electrode having a light transmittance (for visible light) of at least 50% may be used as the first electrode 22 and the second electrode 24.

Typical examples thereof include metal oxide layers such as of tin oxide-indium oxide (ITO), tin oxide, or zinc oxide. The electrode may be composed of a single material or may be composed of a lamination of different materials.

The thickness and the size of the first electrode 22 and the second electrode 24 vary according to the display medium 12, and are not particularly limited.

The light-modulating layer 18 contains the charged mobile particles 30; the first particles 32 having a lower mobility than the charged mobile particles 30 and assuming a color at a lower lightness than the lightness range of the color that the charged mobile particles 30 can assume; the second particles 34 having a lower mobility than the first particles 32 and assuming a color at a higher lightness than the lightness range of the color that the charged mobile particles 30 can assume; and the dispersion medium 36.

As described above, it is possible to make the mobility of the charged mobile particles 30 contained in a light-modulating unit cell in the light-modulating layer 18 higher than those of the first particles 32 and the second particles 34 contained in the same light-modulating unit cell in the light-modulating layer, by adequately adjusting the kinds and concentrations of the surfactant for the charged mobile particles 30, the surface-finishing agent for the charged mobile particles 30, and the like, and the agitation time.

It is also possible to make the mobility of the first particles 32 contained in the same light-modulating unit cell together with the charged mobile particles 30 smaller than that of the charged mobile particles 30 contained in the light-modulating layer 18 and, at the same time, to make the mobility of the second particles 34 contained in the same light-modulating unit cell lower than that of the first particles 32, by appropriately adjusting the kinds and concentrations of the surfactant, the surface-finishing agent for the charged mobile particles 30, and the like, and agitation time, as described above.

For improvement in definition of the display device 10, multiple light-modulating unit cells may be formed in the direction along the plate of the rear-face substrate 16 in the display medium 12, by dividing the space between the rear-face substrate 16 and the display substrate 20 into multiple compartments with spacers 26 in such a manner that the light-modulating layer 18 is divided into multiple compartments disposed in the direction along the substrate face of the rear-face substrate 16 (see light-modulating unit cells $18_1$ to $18_3$ in FIGS. 2A and 2B).

For simplicity, a case where three light-modulating unit cells are formed in the direction along the plate of the rear-face substrate 16 will be described with reference to FIGS. 2A and 2B. However, the number of the light-modulating unit cells may be determined according to the desired number of pixels. Specifically, multiple light-modulating unit cells for R, G, and B may be formed for each pixel.

For example, as shown in FIGS. 2A and 2B, the display device 21 includes a display medium 15 and a voltage application unit 14 (not shown in the FIGS. 2A and 2B, see FIGS. 1A to 1D). Similarly to the display medium 12 shown in FIGS. 1A to 1D, the display medium 15 includes a rear-face substrate 16, a display substrate 20, multiple spacers 26, a first electrode 22, and a second electrode 24, and a light-modulating layer 18 containing multiple light-modulating unit cells $18_1$ to $18_3$.

The first electrode 22, the light-modulating layer 18 containing multiple light-modulating unit cells $18_1$ to $18_3$, the second electrode 24, and the display substrate 20 are laminated on the rear-face substrate 16 in that order.

Multiple spacers 26 are placed between the rear-face substrate 16 and the display substrate 20 to keep the clearance between them to a constant value, dividing the region between the rear-face substrate 16 and the display substrate 20 into multiple compartments (light-modulating unit cells $18_1$ to $18_3$).

Multiple first electrodes 22 are formed linearly in the direction along the substrate face of the rear-face substrate 16 at a particular interval. Multiple second electrodes 24 are formed linearly in the direction along the substrate face of the display substrate 20 and in the direction perpendicular to the length direction of the first electrode 22 at a particular interval.

At least one region at the intersection of the first electrodes 22 and the second electrodes 24 corresponds to each of the light-modulating unit cells $18_1$ to $18_3$.

In forming the first electrode 22 and second electrode 24 in a line-shape, the line width of the first electrode 22 or the second electrode 24 is not particularly limited, but is normally approximately from 2 μm to 1 mm. The thickness of the first electrode 22 or second electrode 24 is not particularly limited either, and is normally approximately from 10 nm to 1 μm.

It is possible to adjust the lightness of each pixel in a wider range, by forming the light-modulating unit cells $18_1$ to $18_3$ corresponding to respective pixels of the image formed on the display medium 15 of display device 21.

It is also possible to adjust the lightness of each pixel in a wider range and to display a high-definition color image on the display device 21 and display medium 15, by providing charged mobile particles 30 assuming at least one color of red, blue or green in each of the light-modulating unit cells $18_1$ to $18_3$, thereby forming a unit region consisting of sequentially-disposed light-modulating unit cells $18_1$ to $18_3$ each forming red, blue, or green color, the unit region corresponding to one pixel of the image displayed on the display device 21.

When the display medium 15 contains multiple light-modulating unit cells $18_1$ to $18_3$ as described above, the size of each of the light-modulating unit cells $18_1$ to $18_3$ may be approximately from 10 μm to 1 mm in view of improvement in definition. When the area of the light-modulating unit cell $18_1$, $18_2$, or $18_3$ in the direction perpendicular to the user-viewing direction X is smaller, the definition of the display medium 15 and the display device 21 can be improved.

An electric wiring, a thin film transistor, a diode having a metal-insulation layer-metal structure, a variable capacitor, a switching element for driving such as of ferroelectric substance may be formed on the substrate of the display device 10 or of display device 21 according to an aspect of the invention.

Hereinafter, the display method by using the display device 10 according to an aspect of the invention shown in FIGS. 1A to 1D will be described.

In the example of FIGS. 1A to 1D, it is assumed that the charged mobile particles 30 are red in color in the dispersed state, the first particles 32 are black particles, and the second particles 34 are white particles.

In the example of FIGS. 1A to 1D, the display method is described, assuming that all of the charged mobile particles 30, the first particles 32, and the second particles 34 are contained in the light-modulating layer 18 in such a state that the particles can migrate therein.

In the example of FIGS. 1A to 1D, it is also assumed that an insulating liquid is used as the dispersion medium 36, the charged mobile particles 30, the first particles 32, and the second particles 34 are electrified to the same polarity, the charged mobile particles 30 have the highest mobility, and the mobility of the first particles 32 is higher than that of the second particles 34.

When no voltage is applied between the first electrode 22 and second electrode 24 by the voltage application unit 14 and there is no electric field generated in the light-modulating layer 18, as shown in FIG. 1A, each of the charged mobile particles 30, the first particles 32, and the second particles 34 contained in the light-modulating layer 18 are dispersed uniformly in the light-modulating layer 18.

In the state shown in FIG. 1A, the display medium 12 exhibits the color of the charged mobile particles 30 in the dispersed state, i.e., red in the example of FIG. 1A, when viewed from the viewing direction X.

Figure 1B:
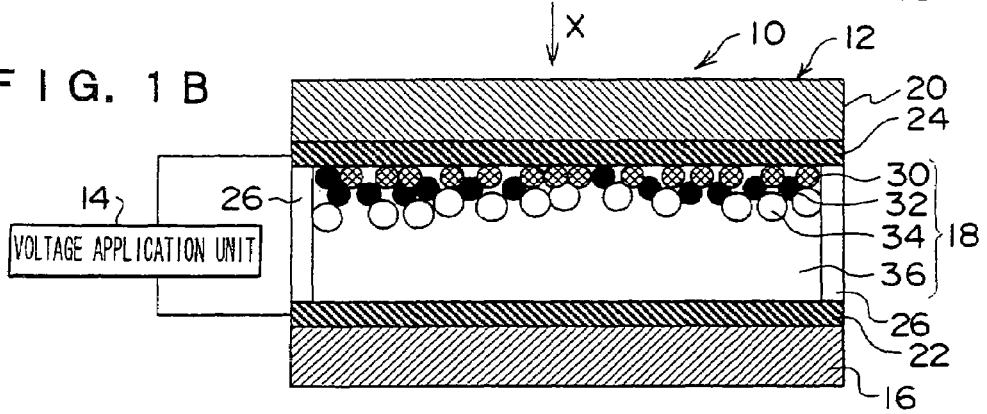

Then, a voltage is applied between the first electrode 22 and the second electrode 24 by the voltage application unit 14 to generate such an electric field in the light-modulating layer 18 that the second particles 34 lowest in mobility can migrate in the light-modulating layer 18 and the charged mobile particles 30, the first particles 32, and second particles 34 migrate toward the display substrate 20. As shown in FIG. 1B, when such an electric field is generated in the light-modulating layer 18, respective particles contained in the light-modulating layer 18 reach the display substrate 20 side in the order of the mobility. That is, the charged mobile particles 30, the first particles 32, and the second particles 34 reach the display substrate 20 side in that order.

When the charged mobile particles 30, the first particles 32, and the second particles 34 are stacked in that order on the display substrate 20 side, the charged mobile particles 30 shown in FIG. 1B become more aggregated than the dispersed state shown in FIG. 1A, and is aligned along the face of the display substrate 20. When viewed from the viewing direction X, the display medium 12 assumes a (deeper) red color with lower lightness than that of the charged mobile particles 30 in the state of being dispersed in the light-modulating layer in 18. This color derives from the color of the charged mobile particles 30 in the aggregation state, which is a deeper red color than the charged mobile particles 30 in the dispersed state, and the black color of the first particles 32 concentrated on the rear-face substrate 16 side of the charged mobile particles 30.

Then, another voltage is applied between the first electrode 22 and second electrode 24 by the voltage application unit 14 to generate such an electric field in the light-modulating layer 18 that the second particles 34 lowest in mobility can migrate in the light-modulating layer 18 and the charged mobile particles 30, the first particles 32, and the second particles 34 migrate toward the rear-face substrate 16 side.

Figure 1C:
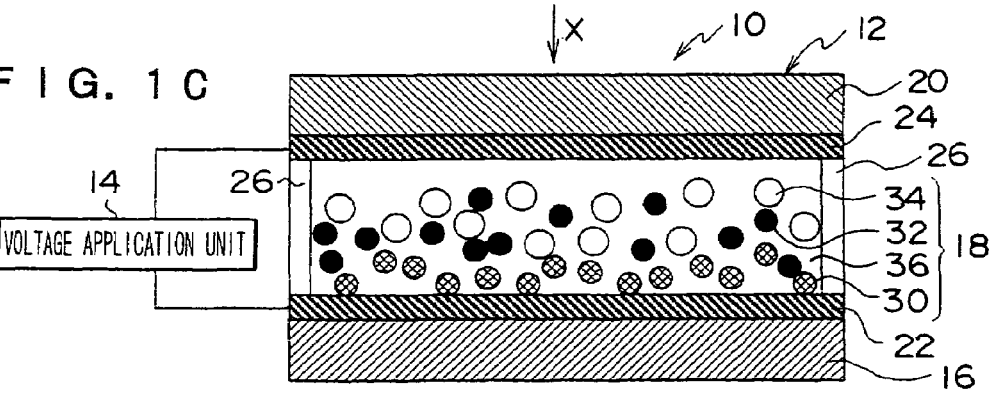

When such an electric field is generated in the light-modulating layer 18, as shown in FIG. 1C, the charged mobile particles 30 highest in mobility among the particles contained in the light-modulating layer 18 reach the rear-face substrate 16 side first.

In such a state, the first particles 32 and the second particles 34 are in the dispersed state in the region of the light-modulating layer 18 closer to viewer in the viewing direction X; and when viewed from the viewing direction X, the display medium 12 assumes a gray color, mixture of black and white, i.e., the color of the mixture of the first particles 32 and the second particles 34.

Figure 1D:
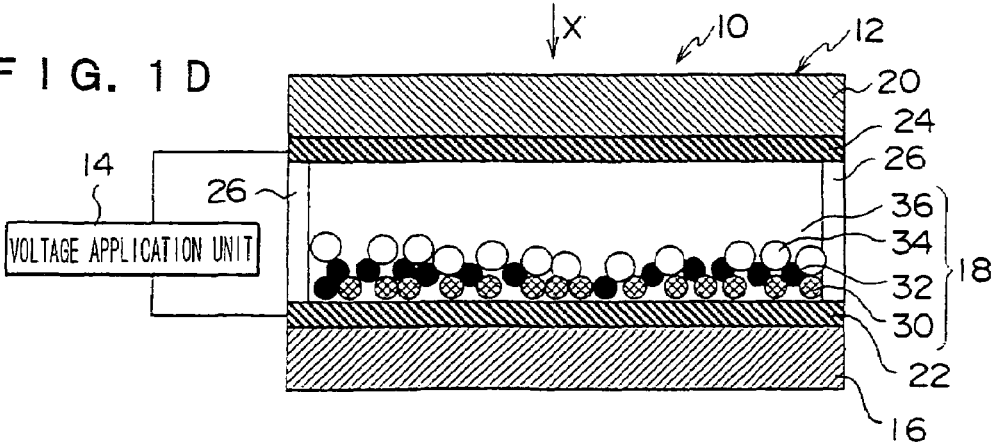

Further, when the application of the voltage between the first electrode 22 and second electrode 24 by the voltage application unit 14 is continued so that such an electric field is generated in the light-modulating layer 18 that the second particles 34 lowest in mobility can migrate in the light-modulating layer 18 and the charged mobile particles 30, the first particles 32, and the second particles 34 migrate toward the rear-face substrate 16 side, as shown in FIG. 1D, the first particles 32, and second particles 34 are stacked in that order on the display substrate 20 side of the layer of the charged mobile particles 30, which reached the rear-face substrate 16 side first. Accordingly, since the layer of the second particles 34 is closest to the display substrate 20 side, the display medium 12 assumes the color of the second particles 34—white—when viewed from the viewing direction X.

As described above, the dispersion state of the charged mobile particles 30, and the ratio between the charged mobile particles 30, the first particles 32, and the second particles 34 in the region of the light-modulating layer 18 closer to the viewer are controlled by using the light-modulating layer 18 containing the charged mobile particles 30 assuming a color at a lightness corresponding to the dispersion state of the particles 30, the first particle 32 having a lower mobility than the charged mobile particles 30 and assuming a color at a lower lightness than the lightness range of the color that the charged mobile particles 30 assume, and the second particles 34 having a lower mobility than the first particles 32 and assuming a color at a higher lightness than the lightness range of the color that the charged mobile particles 30 can assume, and by adjusting the electric-field strength and the period of application of the electric field to the light-modulating layer 18 with an electric-field-generating unit in the voltage application unit 14.

Thus, the variation of the color that the light-modulating layer 18 can assume encompasses a lower lightness range and a higher lightness range than the lightness range of the color that the charged mobile particles 30 can assume, owing to the first particles 32 and the second particles 34; thus, a display device, a display medium, and a displaying method wider in lightness range can be provided.

Although the charged mobile particles 30, the first particles 32, and the second particles 34 are contained in the light-modulating layer 18 in the example shown in FIGS. 1A to 1D, it is also possible to adjust the lightness even when the light-modulating layer 18 does not contain the second particles 34 and the particles contained in the same light-modulating unit cell are only the charged mobile particles 30 and the first particles 32.

Specifically, when a voltage is applied between the first electrode 22 and the second electrode 24 by the voltage application unit 14 to generate such an electric field in the light-modulating layer 18 that the first particles 32 can migrate in the light-modulating layer 18 and the charged mobile particles 30 and the first particles 32 migrate toward the display substrate 20 side, in a similar manner to FIG. 1B, respective particles contained in the light-modulating layer 18 reach the display substrate 20 side in the order of mobility.

That is, the charged mobile particles 30 and the first particles 32 reach the display substrate 20 side in that order, and the display medium 12 assumes deeper red with lower lightness than the color that the display medium 12 assumes when the charged mobile particles 30 and the first particles 32 are dispersed in the light-modulating layer 18.

On the contrary, when a voltage is applied between the first electrode 22 and the second electrode 24 by the voltage application unit 14 to generate such an electric field in the light-modulating layer 18 that the first particles 32 can migrate in the light-modulating layer 18 and the charged mobile particles 30 and the first particles 32 migrate toward the rear-face substrate 16 side, the charged mobile particles 30 and the first particles 32 reach the rear-face substrate 16 side in that order. Accordingly, by migration of the charged mobile particles 30 and the first particles 32 toward the rear-face substrate 16 side, the display medium 12, which showed deep red color, changes its observable color from the deep red color to a red with higher lightness (the color of the charged mobile particles 30 in the dispersion state) and then, to the black color derived from the first particles 32.

Thus, the display medium 12 can assume a color at a lower lightness owing to the first particles 32 than the lightness range of the color that the charged mobile particles 30 can assume, by using the light-modulating layer 18 containing the charged mobile particles assuming a color at a lightness corresponding to the dispersion state of the particles 30, the first particle 32 having a lower mobility than the charged mobile particles 30 and assuming a color at a lower lightness than the lightness range of the color that the charged mobile particles 30 assume, and by forming an electric filed in the light-modulating layer 18 with the voltage application unit 14 as an electric field-generating means; therefore, a display device, a display medium, and a displaying method wider in lightness range can be provided.

Although the charged mobile particles 30, the first particles 32, and the second particles 34 contained in the light-modulating layer 18 are all movable in the light-modulating layer 18 in the examples shown in FIGS. 1A to 1D, the second particles 34 contained in the light-modulating layer 18 may be immobile.

In such a case, as shown in FIG. 3A, a display device 11 includes a voltage application unit 14 and a display medium 13. The display medium 13 includes a rear-face substrate 16, a first electrode 22, spacers 26, a second electrode 24, a display substrate 20, and a light-modulating layer 19.

The configuration shown in FIGS. 3A to 3D is the same as the configuration shown in FIGS. 1A to 1D, except that the second particles contained in the light-modulating layer are immobile; thus, the same elements are indicated with the same reference number, and detailed description thereof will be omitted.

The light-modulating layer 19 contains charged mobile particles 30, first particles 32, second particles 35, and a dispersion medium 36.

The second particles 35 have a larger volume average particle diameter than the first particles 32 and the charged mobile particles 30, and the second particles 35 has such a volume average particle diameter and a loading amount that the second particles 35 are immobile in the light-modulating layer 19; therefore, the first particles 32 and the charged mobile particles 30 migrate from the display substrate 20 side to the rear-face substrate 16 side, or from the rear-face substrate 16 to the display substrate 20 side, through the space among the second particles 35.

Hereinafter, an example of the displaying method in such a display device 11 will be described.

When no voltage is applied between the first electrode 22 and the second electrode 24 by the voltage application unit 14 and no electric field is generated in the light-modulating layer 19, as shown in FIG. 3A, both the charged mobile particles 30 and the first particles 32 contained in the light-modulating layer 19 are dispersed uniformly in the light-modulating layer 19.

In the state shown in FIG. 3A, display medium 13 exhibits the color of the charged mobile particles 30 in the dispersed state, i.e., red in the example of FIG. 3A, when viewed from the viewing direction X.

Then, a voltage is applied between the first electrode 22 and the second electrode 24 by the voltage application unit 14 to generate such an electric field in the light-modulating layer 19 that the first particles 32 having a mobility lower than that of the charged mobile particles 30 can migrate in the light-modulating layer 19 and the charged mobile particles 30, and the first particles 32 migrate toward the display substrate 20 side. When such an electric field is generated in the light-modulating layer 19, as shown in FIG. 3B, the charged mobile particles 30 and the first particles 32 contained in the light-modulating layer 19 reach the display substrate 20 side through the space among the second particles 35 in the order of mobility, i.e., in the order of the charged mobile particles 30 and the first particles 32.

When the charged mobile particles 30 and the first particles 32 are laminated on the display substrate 20 side in this order from the side nearer to the display substrate 20 to the side farther from the display substrate 20, the charged mobile particles 30 shown in FIG. 3B is nearer to the display substrate 20 side and is in a more aggregated state than the dispersed state where the charged mobile particles 30 and the first particles 32 are dispersed as shown in FIG. 3A; therefore, when viewed from the viewing direction X, the display medium 13 exhibits, as the color of the charged mobile particles 30 in the aggregation state, a (deeper) red color at a lower lightness than the color that the charged mobile particles 30 dispersed in the light-modulating layer 19 (as shown in FIG. 3A) assume. The deeper red color derives from the more concentrated red color of the charged mobile particles 30 in the aggregated state compared to the dispersed state, and the black color of the first particles 32 laminated on the layer of the charged mobile particles 30.

Then, a voltage is applied between the first electrode 22 and the second electrode 24 by the voltage application unit 14 to generate such an electric field in the light-modulating layer 19 that the first particles 32 can migrate in the light-modulating layer 19 and the charged mobile particles 30 and the first particles 32 migrate toward the rear-face substrate 16 side. When such an electric field is generated in the light-modulating layer 19, as shown in FIG. 3C, the charged mobile particles 30 highest in mobility among the particles contained in the light-modulating layer 19 reach the rear-face substrate 16 side first.

In such a state, the second particles 35 and the first particles 32 are in the dispersed state in the region of the light-modulating layer 19 closer to the viewing direction X; and when viewed from the viewing direction X, the display medium 13 exhibits a gray color, i.e., a mixed color of black and white, i.e., the color of the mixture of the first particles 32 and the second particles 35.

In addition, when a voltage is applied between the first electrode 22 and the second electrode 24 by the voltage application unit 14 to generate such an electric field in the light-modulating layer 19 that the first particles 32 can migrate in the light-modulating layer 19 and the charged mobile particles 30 and the first particles 32 migrate toward the rear-face substrate 16 side, as shown in FIG. 3D, the first particles 32 migrate through the space among the second particles 35 to the rear-face substrate 16 side.

Thus, when both of the charged mobile particles 30 and the first particles 32 migrate toward the rear-face substrate 16 side, the display medium 13 shows a color white due to the second particles 35 when viewed from the viewing direction X. This is because the second particles 35 have such a volume average particle diameter and such a loading rate that the second particles 35 cannot migrate in the light-modulating layer 19.

Thus, by determining the volume average particle diameter and the loading rate of the second particles 35 such that the second particles 35 having a higher lightness than the first particles 32 and than the lightness range of the color that the charged mobile particles 30 can assume are immobilized in the light-modulating layer 19 and such that the first particles 32 and the charged mobile particles 30 migrate between the rear-face substrate 16 and the display substrate 20 through the space among the second particles 35, it is possible to make the light-modulating layer 19 assume a color at a higher lightness region than that achievable when all of the charged mobile particles 30, the first particle 32. and second particles 34 can migrate in the light-modulating layer 19; therefore, a display device, a display medium, and a displaying method wider in lightness range can be provided.

EXAMPLES

Hereinafter, the present invention will be described specifically with reference to Examples. However, the invention is not restricted by these Examples.

Example 1

An example of the display medium according to an aspect of the invention will be described with reference to FIGS. 3A to 3D.

First, a first ITO electrode 22 is formed to a thickness of 50 nm on a glass rear-face substrate 16 having a thickness 0.7 mm by sputtering, and the electrode is patterned into lines by photolithography and dry etching (line width: 300 μm).

Then, a barrier layer is formed on the rear-face substrate 16 carrying the first electrode 22 by coating a photosensitive polyimide varnish, and the layer is exposed to light and wet-etched to form multiple spacers 26 having a height of 50 μm and a width of 20 μm.

Separately, a second ITO electrode 24 is formed to a thickness of 50 nm on a polyethylene terephthalate (PET) display substrate 20 having a thickness of 200 μm by sputtering, and patterned into lines by photolithography and dry etching. The line width is approximately 300 μm.

A hot-melt adhesive layer is formed on the contact areas between the spacer 26 and the display substrate 20; and then, an aqueous colloidal gold particle dispersion liquid containing the following black particles (hereinafter, referred to as black particles 32) as first particles 32, the following white particles (hereinafter, referred to as white particles 35) as second particles 35, and colloidal gold particles as charged mobile particles 30 is filled in each compartment separated by the multiple spacers 26 on the rear-face substrate 16 carrying the first electrode 22.

Then, the display substrate 20 is adhered under heat to the rear-face substrate 16 such that the second electrode 24 side of the display substrate 20 faces the first electrode 22 side of the rear-face substrate 16, to give a display medium 13 (see FIGS. 3A to 3D).

A voltage application unit 14 is connected to the first electrode 22 and the second electrode 24 such that an electric field can be generated in the light-modulating layer 19 by applying a voltage between the first electrode 22 and the second electrode 24. A display device 11 is formed in this way.

The voltage application unit 14 used is FG110 manufactured by Yokogawa Electric Corporation.

The content of gold in the aqueous colloidal gold particle dispersion liquid is 1.0 wt %.

The volume fraction of the colloidal gold particles in the light-modulating layer 19 is 1.0 vol %; the volume fraction of the black particles as the first particles is 1.0 vol %; and that of the white particles as the second particles (titanium oxide) is 75 vol %.

The colloidal gold particles 30 and the black particles 32 contained in the light-modulating layer 19 are both negatively charged. The white particles 35 contained in the light-modulating layer 19 are not charged negatively or positively.

The electrification state and the mobility of the respective particles are determined by forming a display device 11 by introducing particles of each kind in the light-modulating layer 19, applying a voltage of 3 V between the first electrode 22 and the second electrode 24 of the display device, and measuring the color change (reflection spectrum) associated with the migration of particles with USB2000 manufactured by KEYENCE Corporation.

(Preparation of Colloidal Gold Particle)

A mixture solution of 1 ml of 1 wt % chloroauric acid and 79 ml of distilled water is kept at 70° C., and a mixture solution of 4 ml of 1 wt % citric acid and 4 ml of 1 wt % tannic acid is added thereto, while the solution was stirred. Then, the mixture is heated to 100° C. for 20 minutes and is concentrated to a gold concentration of 1.0 wt %, to give an aqueous dispersion liquid of colloidal gold particles. The colloidal gold particles thus prepared have a volume average particle diameter of 10 nm and a mobility of $2.1 \times 10^{-6}$ $cm^2/Vs$, and assume a red color in the dispersed state.

(Preparation of the First Particle)

Spherical particles of a crosslinked polymethyl methacrylate containing carbon powder having a volume average particle diameter of 20 μm (TECHPOLYMER MBX-20-black, manufactured by Sekisui Plastics Co., Ltd.) are further pulverized and classified, to give first particles having a volume average particle diameter of 100 nm. The mobility of the first particles is $1.1 \times 10^{-6}$ $cm^2/Vs$.

(Preparation of Second Particle)

Spherical particles of titanium oxide-containing crosslinked polymethyl methacrylate having a volume average particle diameter of 20 μm (manufactured by Sekisui Plastics Co., Ltd. TECHPOLYMER MBX-20-white) mixed with fine powder of isopropylmethoxysilane-treated titania at a weight ratio of 100:0.4 are used after classification. The second particles almost do not migrate under application of an electric field and have a mobility of $1.0 \times 10^{-7}$ $cm^2/Vs$ or less.

Observation of the display medium 13 thus prepared reveals that the colloidal gold particles 30 shown in FIG. 3A are in the dispersed state in the light-modulating layer 19 when no voltage was applied between the first electrode 22 and the second electrode 24.

When viewed from the viewing direction X, the display medium 13 assumes a color red, i.e., the color of the colloidal gold particles 30 in the dispersed state.

A voltage of 3 V is applied between the first electrode 22 (negative) and the second electrode 24 (positive) to generate such an electric field in the display medium 12 that the first particles 32 having a lower mobility than the colloidal gold particles 30 migrate toward the display substrate 20 side.

When such a voltage is applied between the first electrode 22 and the second electrode 24, the colloidal gold particles 30 and the first particles 32 migrate through the space among the second particles 35 toward the second electrode 24 side so that the charged mobile particles 30 having a higher mobility migrate faster than the first particles 32 to the second electrode 24 side, i.e., to the display substrate 20 side, as shown in FIG. 3B. This is because the colloidal gold particle 30 and the first particles 32 in the light-modulating layer 19 are negatively charged and the mobility of the colloidal gold particles 30 is higher than that of the first particles 32.

Along with the migration of the colloidal gold particles 30 and the first particles 32 toward the display substrate 20 side, as shown in FIG. 3A, the change in color of the display medium 13 is observed; the lightness is decreased, and the color of the display medium 13 is changed from a red color—the color of the colloidal gold particles 30 in the state of being dispersed in the light-modulating layer 19—to dark red.

Then, a voltage of 3 V is applied between the first electrode 22 (positive) and the second electrode 24 (negative) of the display medium 13 to generate such an electric field in the light-modulating layer 19 that the first particles 32 having a lower mobility than the colloidal gold particles 30 migrate toward the rear-face substrate 16 side.

When such a voltage is applied between the first electrode 22 and the second electrode 24, as shown in FIG. 3C, the colloidal gold particles 30 and the first particles 32 migrate toward the first electrode 22 side through the space among the second particles 35; the charged mobile particles 30 having a greater mobility migrate faster than the first particles 32 toward the first electrode 22 side, i.e., to the rear-face substrate 16 side. This is because the colloidal gold particles 30 and the first particles 32 in the light-modulating layer 19 are negatively charged, and the mobility of the colloidal gold particles 30 is higher than the first particles 32.

Along with the migration of the colloidal gold particles 30 and the first particles 32 toward the rear-face substrate 16 side, the color of the display medium 13 changes from dark red in the state shown in FIG. 3B to gray when the colloidal gold particles 30 migrates to the rear-face substrate 16 side faster than the first particles 32 (see FIG. 3C), and then to white when the first particles 32 also migrates toward the rear-face substrate 16 side (see FIG. 3D).

The lightnesses in the state shown in the FIG. 3B and in the state shown in the FIG. 3D are determined as strengths of reflection spectrum with USB2000 manufactured by KEYENCE Corporation, revealing that the reflection-light intensity in the state of FIG. 3B is 15%, while the reflection-light intensity in the state or FIG. 3D is 40%, which are in the favorable lightness range.

Example 2

In a similar manner to Example 1, another example of the display medium 13 according to an aspect of the invention will be described in Example 2 with reference to FIGS. 3A to 3D. The difference in the mobility of the particles contained in the light-modulating layer 19 ($3.2 \times 10^{-6}$ $cm^2/Vs$) is different from that in Example 1.

In Example 2, a display medium 13 is prepared in a similar manner to Example 1, except that the differences in mobility among the charged mobile particles 30, the first particles 32, and the second particles 34 are different from those in Example 1.

In a similar manner to Example 1, the voltage application unit 14 used is FG110 manufactured by Yokogawa Electric Corporation.

The content of the colloidal silver particles in the aqueous colloidal silver dispersion liquid is 1.0 wt %; the volume fraction of the colloidal silver particles in the light-modulating layer 19 is 1.0 vol %; the volume fraction of the black particle as first particles is 1.0 vol %; and the volume fraction of the white particles as second particles is 75 vol %.

The colloidal silver particles 30 and the black particles 32 are both positively charged in the state of being contained in the light-modulating layer 19. The white particles 35 are not charged positively or negatively in the state of being contained in the light-modulating layer 19.

(Preparation of Colloidal Silver Particle)

5 ml of an ethanol solution (0.5 wt %) of sodium dodecylsulfate is added to 10 ml of a cyclohexane solution (0.05 wt %) containing silver 2-ethylhexanoate; 5 ml of an ethanol solution (0.02 wt %) of ascorbic acid is added thereto; and the mixture is heated to 50° C. for 10 minutes. The colloidal silver solution thus prepared is concentrated to a silver particle concentration of 1.0 wt %. The colloidal silver particles thus prepared have a volume average particle diameter of 5 nm and a mobility of $4.3 \times 10^{-6}$ cm$^2$/Vs, and assume a yellow color in the dispersed state.

(Preparation of First Particle)
Prepared in a similar manner to Example 1

(Preparation of Second Particle)
Prepared in a similar manner to Example 1

The mobility of the respective particles is determined in a similar manner to Example 1. The migration phenomenon of the respective particles is also determined in a similar manner to Example 1. The color change is also evaluated by visual observation in a similar manner to Example 1.

When no voltage is applied between the first electrode 22 and the second electrode 24 of the display medium 13 thus prepared, as shown in FIG. 3A, because the colloidal silver particles 30 are in the dispersed state in the light-modulating layer 19, the display medium 13 develops a color yellow, the color of the colloidal silver particles 30 in the dispersed state, when viewed from the viewing direction X.

A voltage of 5 V is applied between the first electrode 22 (positive) and the second electrode 24 (negative) of the display medium 13 to generate such an electric field in the light-modulating layer 19 that the first particles 32 having a lower mobility than the colloidal silver particle 30 migrate toward the display substrate 20 side.

When such a voltage is applied between the first electrode 22 and the second electrode 24, as shown in FIG. 3B, the colloidal silver particles 30 and the first particles 32 migrate through the space among the second particles 35 toward the second electrode 24 side; and the charged mobile particles 30 having a greater mobility migrate faster than the first particles 32 toward the second electrode 24 side, i.e., to the display substrate 20 side.

Along with the migration of the colloidal silver particles 30 and the first particles 32 toward the display substrate 20 side, the lightness of the color of the display medium 13 decreases from the lightness of the yellow color of the colloidal silver particles 30 in the state of being dispersed in the light-modulating layer 19 shown in FIG. 3A, so that the color of the display medium 13 changes from yellow to dark yellow.

Then, a voltage of 5 V is applied between the first electrode 22 (negative) and the second electrode 24 (positive) of the display medium 13 to generate such an electric field in the light-modulating layer 19 that the first particles 32 having a lower mobility than the colloidal silver particle 30 migrate toward the rear-face substrate 16 side.

When such a voltage is applied between the first electrode 22 and the second electrode 24, as shown in FIG. 3C, the colloidal silver particles 30 and the first particles 32 migrate through the space among the second particles 35 toward the first electrode 22 side, and the charged mobile particles 30 having a greater mobility migrate faster than the first particles 32 toward the first electrode 22 side, i.e., to the rear-face substrate 16 side.

Along with the migration of the colloidal silver particles 30 and the first particles 32 toward the rear-face substrate 16 side, the color of the display medium 13 changes from dark yellow in the state shown in FIG. 3B to gray when the colloidal silver particle 30 migrate faster than the first particles 32 toward the rear-face substrate 16 side (see FIG. 3C), then to white when the first particles 32 also migrate toward the rear-face substrate 16 side (see FIG. 3D).

The lightnesses in the state shown in the FIG. 3B and in the state shown in the FIG. 3D are determined as strengths of reflection spectrum, revealing that the reflection-light intensity in the state of FIG. 3B is 14%, while the reflection-light intensity in the state or FIG. 3D is 40%, which are in the favorable lightness range.

Example 3

An example of the display medium according to an aspect of the invention will be described with reference to FIGS. 2A and 2B.

First, a first ITO electrode 22 is formed to a thickness of 40 nm on a glass rear-face substrate 16 having a thickness 0.7 mm by sputtering, and the electrode is patterned into lines by photolithography and dry etching at an interval of 20 µm (electrode line width: 200 µm, distance between first electrodes 22: 20 µm).

Separately, an ITO second electrode 24 is formed on a polyethylene terephthalate (PET) display substrate 20 having a thickness of 200 µm, and patterned into lines by photolithography and dry etching, at an interval of 20 µm (electrode line width: 200 µm, distance between first electrodes 22: 20 µm).

Then, a barrier layer is formed on the rear-face substrate 16 carrying the first electrode 22 by coating a photosensitive polyimide varnish, and the layer is exposed to light and wet-etched to form multiple spacers 26 having a height of 50 µm and a width of 20 µm, such that at least one line of the first electrode 22 and at least one line of the second electrode 24 described below are formed in each compartment (light-modulating unit cell) separated by multiple spacers 26.

A hot-melt adhesive layer is formed on the contact areas between the spacer 26 and the display substrate 20; and then, a mixture solution containing an aqueous colloidal gold particle dispersion liquid containing the colloidal gold particles as the charged mobile particles 30 (generic term for charged mobile particles 30R, 30G, and 30B) is filled in each compartment (each of the light-modulating unit cell $18_1$ to $18_3$), which is divided by spacers 26 on the rear-face substrate 16 carrying the first electrode 22 and aligned consecutively, such that each compartment contains the following black particle as the first particles 32, the following white particle as the second particles 34, a dispersion medium 36, and charged mobile particles 30R assuming a red color in the dispersed state, charged mobile particles 30G assuming a green color in the dispersed state, or charged mobile particles 30B assuming a blue color in the dispersed state.

Then, the display substrate 20 carrying the second electrode 24 is adhered to the rear-face substrate 16 under heat such that the second electrode 24 side of the display substrate 20 faces the first electrode 22 side of the rear-face substrate 16, and such that the longitudinal direction of the second electrode 24 is perpendicular to the longitudinal direction of the first electrode 22, to give a display medium 15 (see FIGS. 2A and 2B).

At least one intersection of the first electrodes 22 and the second electrodes 24 is contained in each of the light-modulating unit cells $18_1$ to $18_3$. In such a configuration, it is possible to adjust the electric field generated in each of the light-modulating unit cells $18_1$ to $18_3$.

A voltage application unit 14 for generating an electric field in each light-modulating unit cells $18_1$ to $18_3$ by applying a voltage between the first electrode 22 and the second electrode 24 is connected to the first electrode 22 and the second electrode 24 such that signals can be sent therebetween. A display device 21 is formed in this manner.

Black particles (first particles): Prepared in a similar manner to Example 1.

White particles (second particles): Prepared in a similar manner to Example 1.

Voltage application unit 14: FG110 manufactured by Yokogawa Electric Corporation.

The content of the colloidal gold particles 30R, 30G, or 30B assuming red, green, or blue in the dispersed state in the aqueous colloidal gold dispersion liquid is 1.0 wt %; the volume fraction of the colloidal gold particles in the light-modulating layer 19 is 1.0 vol %; volume fraction of the black particles in the first particles is 1.0 vol %; and the volume fraction of the white particles (titanium oxide) as the second particles is 75 vol %.

The colloidal gold particles 30R, 30B, and 30G, and the black particle 32 are all negatively charged in the state of being contained in the light-modulating unit cells $18_1$ to $18_3$. The white particles 34 are not charged positively or negatively in the state of being contained in the light-modulating unit cells $18_1$ to $18_3$.

The electrification state is determined in a similar manner to Example 1.

(Preparation of Colloidal Gold Particles 30R)

A mixture solution of 1 ml of 1 wt % chloroauric acid and 79 ml of distilled water is kept at 70° C., and a mixture solution of 4 ml of 1 wt % citric acid and 4 ml of 1 wt % tannic acid is added thereto while the solution is stirred. Then, the mixture is heat to 100° C. for 20 minutes and concentrated to a gold concentration of 1.0 wt %, to give an aqueous dispersion liquid of colloidal gold particles. The colloidal gold particles thus prepared have a volume average particle diameter of 10 nm and a mobility of $2.1 \times 10^{-6}$ cm$^2$/Vs, and assume a red color in the dispersed state.

(Preparation of Colloidal Gold Particle 30G)

A mixture solution of 1 ml of 1 wt % chloroauric acid and 79 ml of distilled water is kept at 60° C., and a mixture solution of 4 ml of 0.005 wt % citric acid and 4 ml of 1 wt % tannic acid is added thereto while the solution is stirred. Then, sodium laurylsulfate is added thereto in an amount of 0.6 wt % with respect to the colloidal gold particles, and the mixture is heated to 100° C. for 30 minutes and concentrated to a gold concentration of 0.1 wt %, to give an aqueous dispersion liquid containing colloidal gold particles. The colloidal gold particles thus prepared have a volume average particle diameter of 50 nm and a mobility of $3.0 \times 10^{-6}$ cm$^2$/Vs, and assume a green color in the dispersed state.

(Preparation of the Colloidal Gold Particle 30B)

A mixture solution of 1 ml of 1 wt % chloroauric acid and 79 ml of distilled water is kept at 60° C., and a mixture solution of 4 ml of 0.1 wt % citric acid and 4 ml of 1 wt % tannic acid is added thereto while the solution is stirred. Then, the mixture is heated to 100° C. for 30 minutes and concentrated to a gold concentration of 0.1 wt %, to give an aqueous dispersion liquid of colloidal gold particles. The colloidal gold particles thus prepared have a volume average particle diameter of 35 nm and a mobility of $5.1 \times 10^{-6}$ cm$^2$/Vs, and assume a blue color in the dispersed state.

(Preparation of First Particles)

Prepared in a similar manner to Example 1

(Preparation of Second Particles)

Prepared in a similar manner to Example 1

The mobility of respective particles is determined in a similar manner to Example 1. The migration phenomenon and the colors of the respective particles are also determined in a similar manner to Example 1.

In the display medium 15 and the display device 21 thus prepared, when no voltage is applied between the first electrode 22 and the second electrode 24, as shown in FIG. 2A, the colloidal gold particles 30R, 30G and 30B are in the dispersed state respectively in the light-modulating unit cells $18_1$, $18_2$, and $18_3$; and thus, when viewed from the viewing direction X, the light-modulating unit cell $18_1$ assume a color red of the colloidal gold particle 30R particle in the dispersed state; the light-modulating unit cell $18_2$ assume a color green of the colloidal gold particle 30G in the dispersed state; and the light-modulating unit cell $18_3$ assume a color blue of the colloidal gold particle 30B in the dispersed state.

An voltage of 3 V is applied between the first electrodes 22 (positive) and the second electrodes 24 (negative) corresponding to the light-modulating unit cells $18_1$ and $18_3$ among the multiple first electrodes 22 and the multiple second electrodes 24 of the display medium 15. The application of the voltage is conducted to generate such an electric field in the light-modulating unit cells $18_1$ and $18_3$ that the first particles 32 migrate toward the rear-face substrate 16 side.

In addition, a voltage of 3 V is applied between the first electrode 22 (negative) and the second electrode 24 (positive) corresponding to the light-modulating unit cell $18_2$ among the multiple first electrodes 22 and the multiple second electrodes 24. The application of the voltage is conducted to generate such an electric field in the light-modulating unit cell $18_2$ that the first particles 32 migrate toward the display substrate 20 side.

When such voltages are applied to the first electrodes 22 and the second electrodes 24 corresponding to the light-modulating unit cells $18_1$, $18_2$, and $18_3$, as shown in FIG. 2B, the colloidal gold particles 30R and 30B respectively in the light-modulating unit cells $18_1$ and $18_3$ migrate together with the first particles 32 at a higher velocity than the first particles 32 through the space among the second particles 34 toward the first electrode 22 side (rear-face substrate 16 side).

Along with the migration of particles, the colors of the light-modulating unit cells $18_1$ and $18_3$ change respectively from red and blue, to gray, and then to white.

In addition, as shown in FIG. 2B, the colloidal gold particles 30G in the light-modulating layer $18_2$ migrate together with the first particles 32 at a higher velocity than the first particles 32 through the space among the second particles 34 toward the second electrode 24 side (display substrate 20 side).

Along with the migration of the particles, the color of the light-modulating layer $18_2$ changes from green to dark green with gradual decrease in lightness.

Comparative Example 1

In Comparative Example 1, a display medium 13 and a display device 11 are prepared in a similar manner to Example 1, except that the light-modulating layer 19 does not contain black particles as the first particles 32 nor white particles as the second particles 35.

In the display medium 13 thus prepared, when no voltage is applied between the first electrode 22 and the second electrode 24, the colloidal gold particles 30 are in the dispersed state in the light-modulating layer 19; and thus, when viewed from the viewing direction X, the display medium 13 assumes a color red—the color of the colloidal gold particles 30 in the dispersed state.

The lightness in this state is determined as the strength of reflection spectrum strength with USB2000 manufactured by KEYENCE Corporation, and the reflection-light intensity is 30%.

When a voltage of 15 V is applied between the first electrode 22 and the second electrode 24 of the display medium 13 such that the first electrode 22 side is negative and the second electrode 24 side is positive, the colloidal gold particles 30 in the light-modulating layer 19 migrate toward the second electrode 24 side, i.e., to the display substrate 20 side.

Along with the migration of colloidal gold particles 30 toward the display substrate 20 side, the color of the display medium 13 changes from red—the color of the colloidal gold particle 30 in the dispersed state in the light-modulating layer 19—to dark red with gradual decrease in lightness.

The lightness in this state is determined as the strength of reflection spectrum strength by using USB2000 manufactured by KEYENCE Corporation, and the reflection-light intensity is 25%.

Then, a voltage of 3 V is applied between the first electrode 22 (positive) and the second electrode 24 (negative) of the display medium 13 to generate such an electric field in the light-modulating layer 19 that the colloidal gold particle 30 migrate toward the rear-face substrate-16 side.

When such a voltage is applied between the first electrode 22 and the second electrode 24, the colloidal gold particles 30 in the light-modulating layer 19, which are negatively charged, migrate toward the first electrode 22 side, i.e., to the rear-face substrate 16 side. Along with the migration of the colloidal gold particles 30 toward the rear-face substrate 16 side, the color of the display medium 13 changes from the dark red to a lighter red color than the dark red, and then to dark red again.

The lightness at the time the color changes to the lighter red is determined as reflection spectrum strength by using USB2000 manufactured by KEYENCE Corporation, and the reflection-light intensity is 30%.

On the other hand, the lightness at the time the colloidal gold particles 30 and the first particles 32 migrate toward the display substrate 20 side in Example 1 above is determined as reflection spectrum strength with USB2000 manufactured by KEYENCE Corporation and the reflection-light intensity is found to be 15%; the lightness at the time the colloidal gold particles 30 and the first particles 32 migrate toward the rear-face substrate 16 side in Example 1 above is determined as the reflection spectrum strength with USB2000 manufactured by KEYENCE Corporation, and the reflection-light intensity is found to be 40%. The results reveal that the variation of the lightness of the color that the light-modulating layer of Example 1 can assume is wider than that achievable by the light-modulating layer of Comparative Example 1.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A display medium comprising a light-modulating layer containing charged mobile particles assuming a color exhibiting a brightness that corresponds to the dispersion state of the charged mobile particles, and also containing first particles with lower mobility than the charged mobile particles, the first particles assuming a color exhibiting a brightness that is outside a brightness range that the charged mobile particles can exhibit, wherein a mobility of the charged mobile particles is higher by at least $1\times10^{-6}$ cm$^2$/Vs than the mobility of the first particles.

2. The display medium of claim 1, wherein the first particles are black particles.

3. A display medium comprising a light-modulating layer containing charged mobile particles assuming a color exhibiting a brightness that corresponds to the dispersion state of the charged mobile particles, and also containing first particles with lower mobility than the charged mobile particles, the first particles assuming a color exhibiting a brightness that is outside a brightness range that the charged mobile particles can exhibit, wherein the first particles assume a color exhibiting a lower brightness than the brightness range that the charged mobile particles can exhibit, and the light-modulating layer further contains second particles with lower mobility than the first particles, the second particles assuming a color exhibiting a higher brightness than the brightness range that the charged mobile particles can exhibit.

4. The display medium according to claim 3, wherein the mobility of the first particles is higher by at least $1\times10^{-6}$ cm$^2$/Vs than the mobility of the second particles.

5. The display medium according to claim 3, wherein the second particles have a larger volume average particle diameter than the charged mobile particles and the first particles.

6. The display medium according to claim 3, wherein the second particles are white particles.

7. A display medium comprising a light-modulating layer containing charged mobile particles assuming a color exhibiting a brightness that corresponds to the dispersion state of the charged mobile particles, and also containing first particles with lower mobility than the charged mobile particles, the first particles assuming a color exhibiting a brightness that is outside a brightness range that the charged mobile particles can exhibit, wherein the charged mobile particles are colloidal metal particles having color strength due to surface plasmon resonance.

8. The display medium according to claim 7, wherein the colloidal metal particles are gold or silver particles.

9. A display device comprising a light-modulating layer and an electric field-generating unit that generates an electric field in the light-modulating layer, the light-modulating layer containing charged mobile particles assuming a color exhibiting a brightness corresponding to the dispersion state of the charged mobile particles, and also containing first particles with lower mobility than the charged mobile particles, and the first particles assuming a color exhibiting a brightness that is outside the brightness range that the charged mobile particles can exhibit, wherein the mobility of the charged mobile particles is higher by at least $1\times10^{-6}$ cm$^2$/Vs than the mobility of the first particles.

10. The display device of claim 9, wherein the first particles are black particles.

11. A display device comprising a light-modulating layer and an electric field-generating unit that generates an electric field in the light-modulating layer, the light-modulating layer containing charged mobile particles assuming a color exhibiting a brightness corresponding to the dispersion state of the charged mobile particles, and also containing first particles with lower mobility than the charged mobile particles, and the first particles assuming a color exhibiting a brightness that is outside the brightness range that the charged mobile particles can exhibit, wherein the first particles assume a color exhibiting a lower brightness than the brightness range that the charged mobile particles can exhibit, and the light-modulating layer further contains second particles with lower mobility than the first particles, and the second particles assume a color exhibiting a higher brightness than the brightness range that the charged mobile particles can exhibit.

12. The display device according to claim 11, wherein the mobility of the first particles is higher by at least $1 \times 10^{-6}$ $cm^2/Vs$ than the mobility of the second particles.

13. The display device according to claim 11, wherein the second particles have a larger volume average particle diameter than the charged mobile particles and the first particles.

14. The display device according to claim 11, wherein the second particles are white particles.

15. A display device comprising a light-modulating layer and an electric field-generating unit that generates an electric field in the light-modulating layer, the light-modulating layer containing charged mobile particles assuming a color exhibiting a brightness corresponding to the dispersion state of the charged mobile particles, and also containing first particles with lower mobility than the charged mobile particles, and the first particles assuming a color exhibiting a brightness that is outside the brightness range that the charged mobile particles can exhibit, wherein the charged mobile particles are colloidal metal particles having color strength due to surface plasmon resonance.

16. The display device according to claim 15, wherein the colloidal metal particles are gold or silver particles.

17. A displaying method comprising:

dispersing charged mobile particles, first particles, and second particles in a light-modulating layer, wherein the charged mobile particles assume a color corresponding to the dispersion state of the charged mobile particles, the first particles have lower mobility than the charged mobile particles and have a lower brightness than the brightness range that the charged mobile particles can exhibit, and the second particles have lower mobility than the first particles and assume a color exhibiting a higher brightness than the brightness range that the charged mobile particles can exhibit; and moving the charged mobile particles, the first particles, and the second particles in a predetermined display direction in the light-modulating layer.

* * * * *